US012309673B2

(12) United States Patent
Filippou et al.

(10) Patent No.: US 12,309,673 B2
(45) Date of Patent: May 20, 2025

(54) MULTI-ACCESS EDGE COMPUTING (MEC) VEHICLE-TO-EVERYTHING (V2X) INTEROPERABILITY SUPPORT FOR MULTIPLE V2X MESSAGE BROKERS

(71) Applicant: Intel Corporation, Santa Clara, CA (US)

(72) Inventors: Miltiadis Filippou, Munich (DE); Dario Sabella, Gassino (IT)

(73) Assignee: Intel Corporation, Santa Clara, CA (US)

( * ) Notice: Subject to any disclaimer, the term of this patent is extended or adjusted under 35 U.S.C. 154(b) by 500 days.

(21) Appl. No.: 17/559,229

(22) Filed: Dec. 22, 2021

(65) Prior Publication Data

US 2022/0116755 A1 Apr. 14, 2022

Related U.S. Application Data

(60) Provisional application No. 63/197,608, filed on Jun. 7, 2021.

(51) Int. Cl.
*H04L 67/60* (2022.01)
*H04L 69/08* (2022.01)
(Continued)

(52) U.S. Cl.
CPC ............... *H04W 4/44* (2018.02); *H04L 67/60* (2022.05); *H04L 69/08* (2013.01); *H04W 4/12* (2013.01); *H04W 4/20* (2013.01); *H04W 60/04* (2013.01)

(58) Field of Classification Search
CPC ......... H04L 67/60; H04L 69/08; H04L 67/51; H04L 67/565; H04L 67/63; H04W 4/12; H04W 4/20; H04W 60/04; H04W 4/44
(Continued)

(56) References Cited

U.S. PATENT DOCUMENTS

2019/0079659 A1* 3/2019 Adenwala ............... H04W 4/46
2019/0141610 A1* 5/2019 Sabella ............... G06F 9/45533
(Continued)

FOREIGN PATENT DOCUMENTS

WO WO-2019236755 A1 * 12/2019 ........ H04W 36/0033

OTHER PUBLICATIONS

"ETSI GS MEC 030 V2.1.1", Multi-access Edge Computing (MEC); V2X Information Service API, (Apr. 2020), 59 pgs.
(Continued)

*Primary Examiner* — Karen C Tang
(74) *Attorney, Agent, or Firm* — Schwegman Lundberg & Woessner, P.A.

(57) ABSTRACT

A machine-readable storage medium includes instructions stored thereupon, which when executed by processing circuitry of a computing node operable to implement a V2X information service (VIS) in a MEC network, cause the processing circuitry to perform operations comprising detecting a subscription request to an information service. The subscription request originates from a MEC application instantiated on a MEC host and includes at least one filtering criterion indicative of an information-processing configuration of the MEC application. The subscription request with the at least one filtering criterion is forwarded to a plurality of providers of the information service. A response message received from at least one of the providers is decoded. The response message indicates an acceptance of the subscription request by the at least one provider. An acknowledgment message is encoded for transmission to the MEC application, indicating the acceptance of the subscription request by the at least one provider.

25 Claims, 18 Drawing Sheets

(51) Int. Cl.
  *H04W 4/12*  (2009.01)
  *H04W 4/20*  (2018.01)
  *H04W 4/44*  (2018.01)
  *H04W 60/04*  (2009.01)

(58) Field of Classification Search
  USPC ......................................................... 709/224
  See application file for complete search history.

(56) References Cited

U.S. PATENT DOCUMENTS

| | | | |
|---|---|---|---|
| 2019/0319868 A1* | 10/2019 | Svennebring | H04W 24/08 |
| 2020/0007414 A1* | 1/2020 | Smith | H04L 67/12 |
| 2020/0008044 A1* | 1/2020 | Poornachandran | H04L 41/5019 |
| 2020/0178198 A1* | 6/2020 | Ding | H04W 60/04 |
| 2020/0314614 A1* | 10/2020 | Moustafa | H04L 67/34 |
| 2021/0136716 A1* | 5/2021 | Ge | H04L 67/12 |

OTHER PUBLICATIONS

"ETSI GS MEC 003 V2.2.1", Multi-access Edge Computing (MEC); Framework and Reference Architecture, (Dec. 2020), 21 pgs.

"ETSI GS MEC 011 V2.2.1", Multi-access Edge Computing (MEC); Edge Platform Application Enablement, 78 pgs.

\* cited by examiner

1400

1402 — DETECT A SUBSCRIPTION REQUEST TO AN INFORMATION SERVICE, THE SUBSCRIPTION REQUEST ORIGINATING FROM A MEC APPLICATION INSTANTIATED ON A MEC HOST OF A MEC NETWORK, AND THE SUBSCRIPTION REQUEST INCLUDING AT LEAST ONE FILTERING CRITERION

1404 — FORWARD THE SUBSCRIPTION REQUEST WITH THE AT LEAST ONE FILTERING CRITERION TO A PLURALITY OF COMPUTING RESOURCES, THE COMPUTING RESOURCES CONFIGURED AS A CORRESPONDING PLURALITY OF PROVIDERS OF THE INFORMATION SERVICE

1406 — DECODE A RESPONSE MESSAGE RECEIVED FROM AT LEAST ONE PROVIDER OF THE PLURALITY OF PROVIDERS, THE RESPONSE MESSAGE INDICATING AN ACCEPTANCE OF THE SUBSCRIPTION REQUEST BY THE AT LEAST ONE PROVIDER

1408 — ENCODE AN ACKNOWLEDGMENT MESSAGE FOR TRANSMISSION TO THE MEC APPLICATION, THE ACKNOWLEDGMENT MESSAGE INDICATING THE ACCEPTANCE OF THE SUBSCRIPTION REQUEST BY THE AT LEAST ONE PROVIDER

*FIG. 14*

MULTI-ACCESS EDGE COMPUTING (MEC) VEHICLE-TO-EVERYTHING (V2X) INTEROPERABILITY SUPPORT FOR MULTIPLE V2X MESSAGE BROKERS

PRIORITY CLAIM

This application claims the benefit of priority to U.S. Provisional Patent Application Ser. No. 63/197,608, filed Jun. 7, 2021, and entitled "MEC V2X API INTEROPERABILITY SUPPORT FOR MULTIPLE V2X MESSAGE BROKERS," which provisional patent application is incorporated herein by reference in its entirety.

TECHNICAL FIELD

Aspects pertain to wireless communications including edge computing and next generation (NG) communications. Some aspects relate to Multi-Access Edge Computing (MEC) vehicle-to-everything (V2X) application programming interface (API) interoperability support for multiple V2X message brokers.

BACKGROUND

Edge computing, at a general level, refers to the transition of compute and storage resources closer to endpoint devices (e.g., consumer computing devices, user equipment, etc.) to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with MEC approaches, also known as "multi-access edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for the operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

Similarly, Internet of Things (IoT) networks and devices are designed to offer a distributed compute arrangement, from a variety of endpoints. IoT devices are physical or virtualized objects that may communicate on a network and may include sensors, actuators, and other input/output components, which may be used to collect data or perform actions in a real-world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, private enterprise networks (e.g., software-defined wide-area networks, or SD-WANs), and IoT networks, devices, and services have introduced several advanced use cases and scenarios occurring at and towards the edge of the network. However, these advanced use cases have also introduced some corresponding technical challenges relating to security, processing, and network resources, service availability, and efficiency, among many other issues. One such challenge is MEC V2X API interoperability support for multiple V2X message brokers in a MEC infrastructure.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 14 illustrates a flow diagram of a method for performing a VIS configuration in a MEC network, according to an example embodiment.

DETAILED DESCRIPTION

The following embodiments generally relate to methods, configurations, and apparatuses for providing MEC V2X API interoperability support for multiple V2X message brokers in a MEC infrastructure. The following examples introduce specific configurations and usage of the V2X information service (VIS) mesh control plane for providing MEC V2X API interoperability support. Example embodiments can be implemented in systems similar to those shown in any of the systems described below in reference to FIGS. 1-8C. Additional description of various network entities using, configuring, or performing the VIS functions is provided herein below in connection with at least FIG. 9A-FIG. 14.

Figure 1:
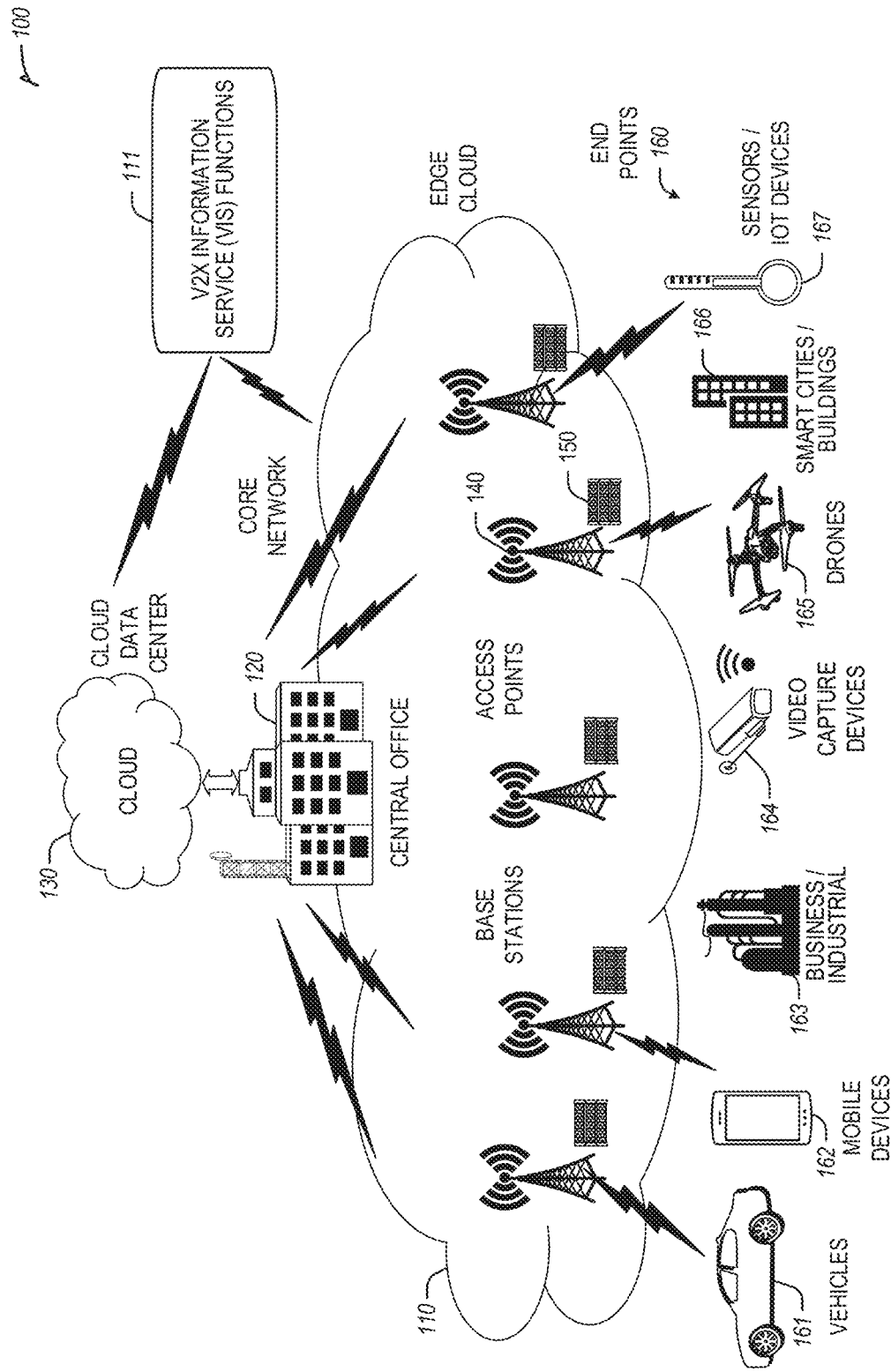
FIG. 1 illustrates an overview of an edge cloud configuration for edge computing using slice configuration functions (SCF)

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power are often constrained. Thus, edge computing attempts to reduce the number of resources needed for network services, through the distribution of more resources that are located closer to both geographically and in-network access time. In this manner, edge computing attempts to bring the compute resources to the workload data where appropriate or bring the workload data to the compute resources.

The following describes aspects of an edge cloud architecture that covers multiple potential deployments and addresses restrictions that some network operators or service providers may have in their infrastructures. These include a variety of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use cases (e.g., autonomous driving or video surveillance) for connected client devices. As an example, base stations may be augmented with compute and acceleration resources to directly process service workloads for the connected user equipment, without further communicating data via backhaul networks. As another example, central office network management hardware may be replaced with standardized compute hardware that performs virtualized network functions and offers compute resources for the execution of services and consumer functions for connected devices. Within edge computing networks, there may be scenarios in services in which the compute resource will be "moved" to the data, as well as scenarios in which the data will be "moved" to the compute resource. As an example, base station compute, acceleration and network resources can provide services to scale to workload demands on an as-needed basis by activating dormant capacity (subscription, capacity-on-demand) to manage corner cases, emergencies or to provide longevity for deployed resources over a significantly longer implemented lifecycle.

In some aspects, the edge cloud 110 and the cloud data center 130 can be configured with V2X information service (VIS) functions 111. Example VIS functions include configuration of a V2X message subscription service for V2X message brokers, facilitating subscription of V2X message consumers to V2X message brokers, protocol conversion for subscription data communicated between V2X message consumers, and V2X message brokers, which functionalities are discussed in greater detail in connection with FIG. 9A-FIG. 14.

Figure 2:
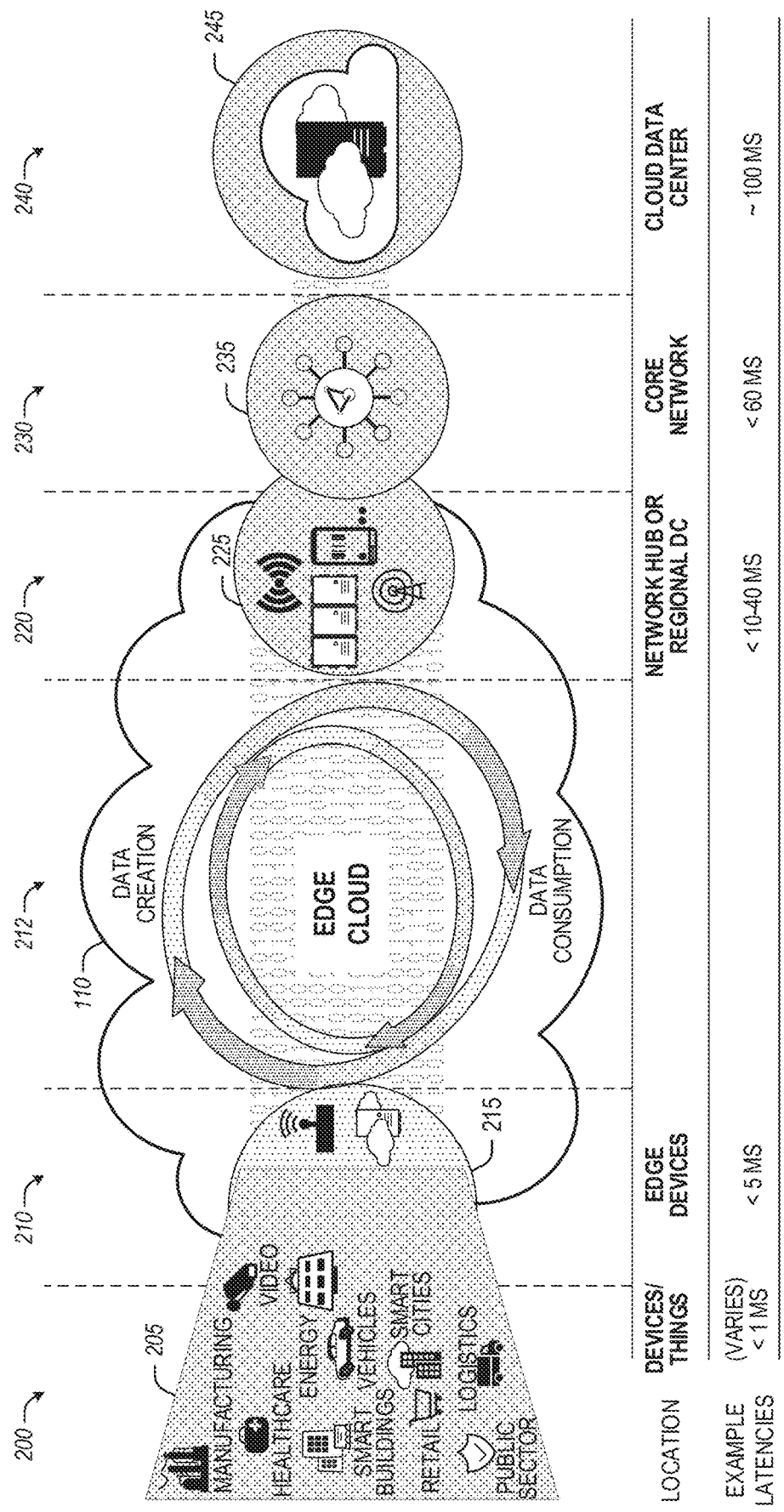
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted. Any of the communication use cases 205 can be configured with VIS functions 111, which may be performed by a communication node configured as an orchestration management entity or a MEC host within a MEC network, or (2) performed by a board management controller (BMC) of a computing node. Example VIS functions are discussed in greater detail in connection with FIG. 9A-FIG. 14.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network layer 230 and cloud data center layer 240, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, a number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of (a) Priority (throughput or latency; also referred to as service level objective or SLO) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, whereas some other input streams may tolerate an occasional failure, depending on the application); and (c) Physical constraints (e.g., power, cooling, and form-factor).

The end-to-end service view for these use cases involves the concept of a service flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real-time, and runtime contractual compliance for the transaction during the lifecycle of the service. When a component in the transaction is missing its agreed to Service Level Agreements (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing come the following caveats. The devices located at the edge are often resource-constrained and therefore there is pressure on the usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permission access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from the client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, the cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or another thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources that are proximately located to radio access network (RAN) capable endpoint devices (e.g., mobile computing devices, IoT devices, smart devices, etc.), which are discussed herein. In other words, the edge cloud 110 may be envisioned as an "edge" that connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing device. For example, the edge cloud 110 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect the contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein, and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent of other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIGS. 8A-8C. The edge cloud 110 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code, or scripts may execute while being isolated from one or more other applications, software, code, or scripts.

Figure 3:
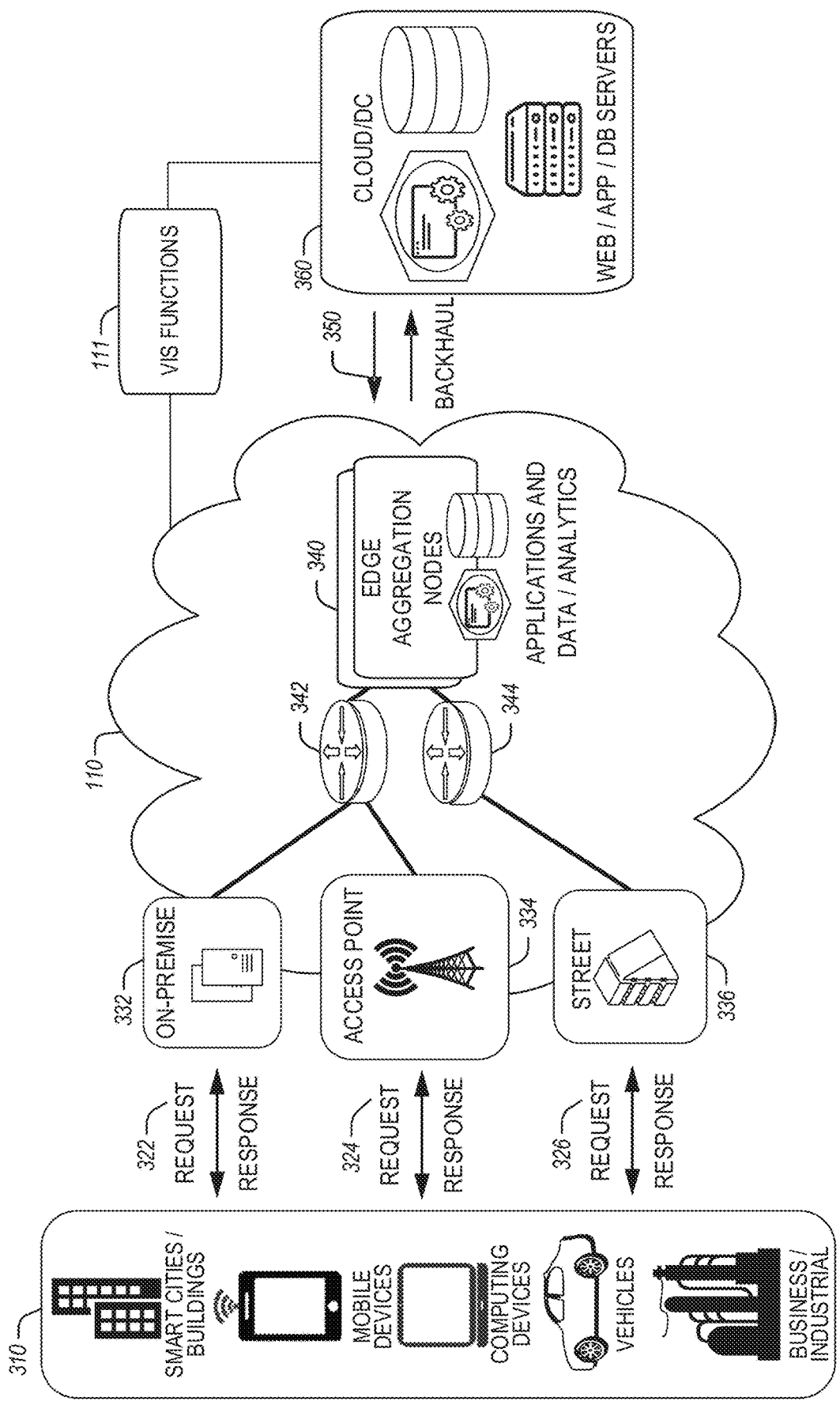
FIG. 3 illustrates an example approach for networking and services in an edge computing system using the SCF.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

In an example embodiment, the edge cloud 110 and the cloud or data center 360 utilize VIS functions 111 in connection with disclosed techniques. The VIS functions 111 may be performed by a communication node configured as an orchestration management entity or a MEC host within a MEC network, or (2) performed by a board management controller (BMC) of a computing node. Example VIS functions are discussed in greater detail in connection with FIG. 9A-FIG. 14.

Figure 4:
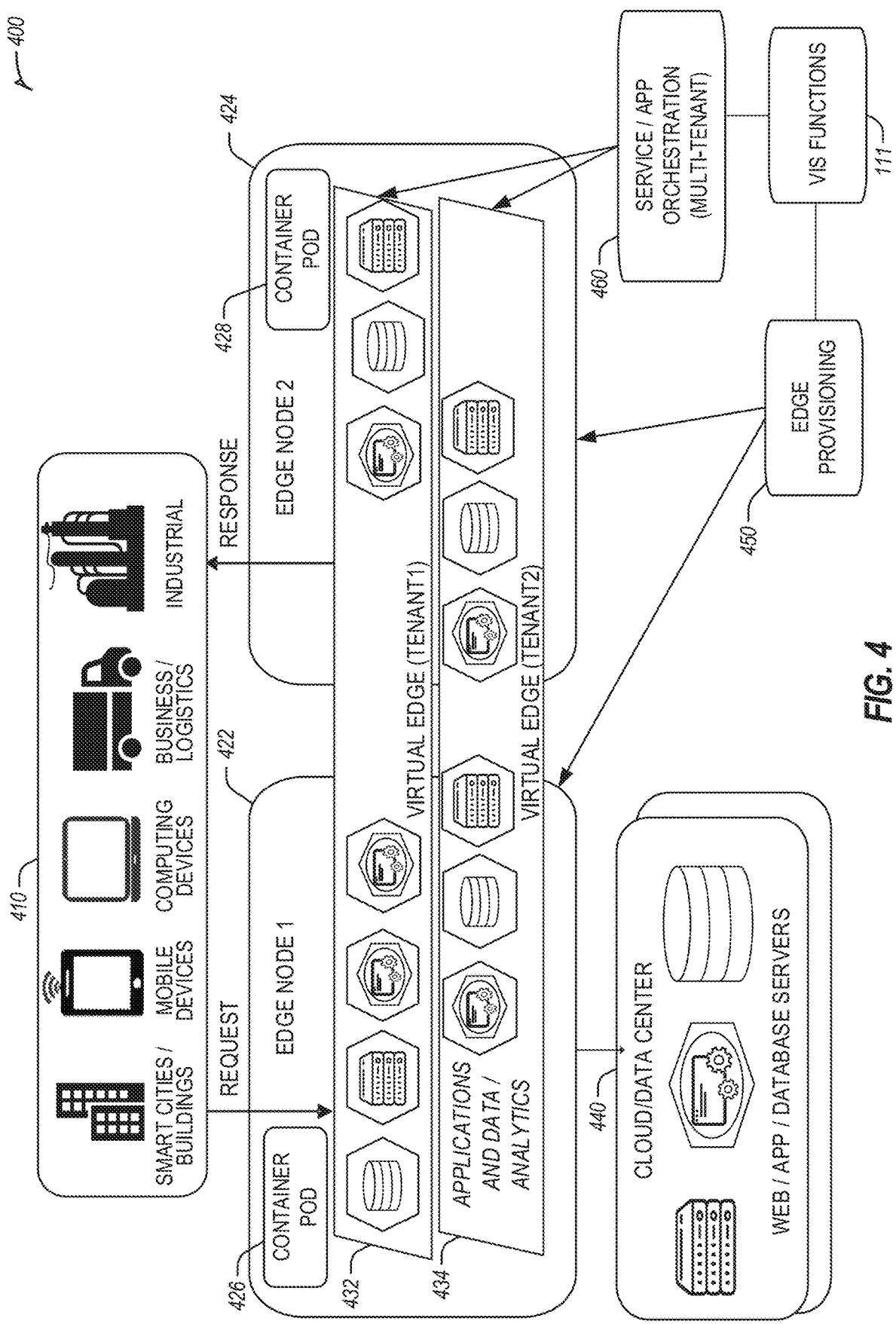
FIG. 4 illustrates deployment of a virtual edge configuration in an edge computing system with SCF operated among multiple edge nodes and multiple tenants.

FIG. 4 illustrates deployment and orchestration for virtual edge configurations across an edge computing system operated among multiple edge nodes and multiple tenants. Specifically, FIG. 4 depicts the coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 (or virtual edges) provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge instance 432, offered to a first tenant (Tenant 1), which offers the first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

In an example embodiment, the edge provisioning functions 450 and the orchestration functions 460 can utilize VIS functions 111 in connection with disclosed techniques. The VIS functions 111 may be performed by a communication node configured as an orchestration management entity or a MEC host within a MEC network, or (2) performed by a board management controller (BMC) of a computing node. Example VIS functions are discussed in greater detail in connection with FIG. 9A-FIG. 14.

It should be understood that some of the devices in the various client endpoints 410 are multi-tenant devices where Tenant 1 may function within a tenant1 'slice' while Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant-specific cryptographic key such that the combination of key and slice may be considered a "root of trust" (RoT) or tenant-specific RoT. An RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in virtual edge instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshaling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain an RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support an RoT context for each. Accordingly, the respective RoTs spanning devices in 410, 422, and 440 may coordinate the establishment of a distributed trusted computing base (DTCB) such that a tenant-specific virtual trusted secure channel linking all elements end to end can be established.

Further, it will be understood that a container may have data or workload-specific keys protecting its content from a previous edge node. As part of the migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container-specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency-sensitive applications; latency-critical applications; user plane applications; networking applications; etc.). The virtual edge instances may also be spanned across systems of multiple owners at different geographic locations (or respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices of virtual edges 432, 434 are partitioned according to the needs of each container.

With the use of container pods, a pod controller oversees the partitioning and allocation of containers and resources. The pod controller receives instructions from an orchestrator (e.g., performing orchestration functions 460) that instructs the controller on how best to partition physical resources and for what duration, such as by receiving key performance indicator (KPI) targets based on SLA contracts. The pod controller determines which container requires which resources and for how long to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents the assignment of resources until the right tenant authenticates or prevents provisioning of data or a workload to a container until an attestation result is satisfied.

Also, with the use of container pods, tenant boundaries can still exist but in the context of each pod of containers. If each tenant-specific pod has a tenant-specific pod controller, there will be a shared pod controller that consolidates resource allocation requests to avoid typical resource starvation situations. Further controls may be provided to ensure the attestation and trustworthiness of the pod and pod controller. For instance, the orchestration functions 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked before the second pod executes.

Figure 5:
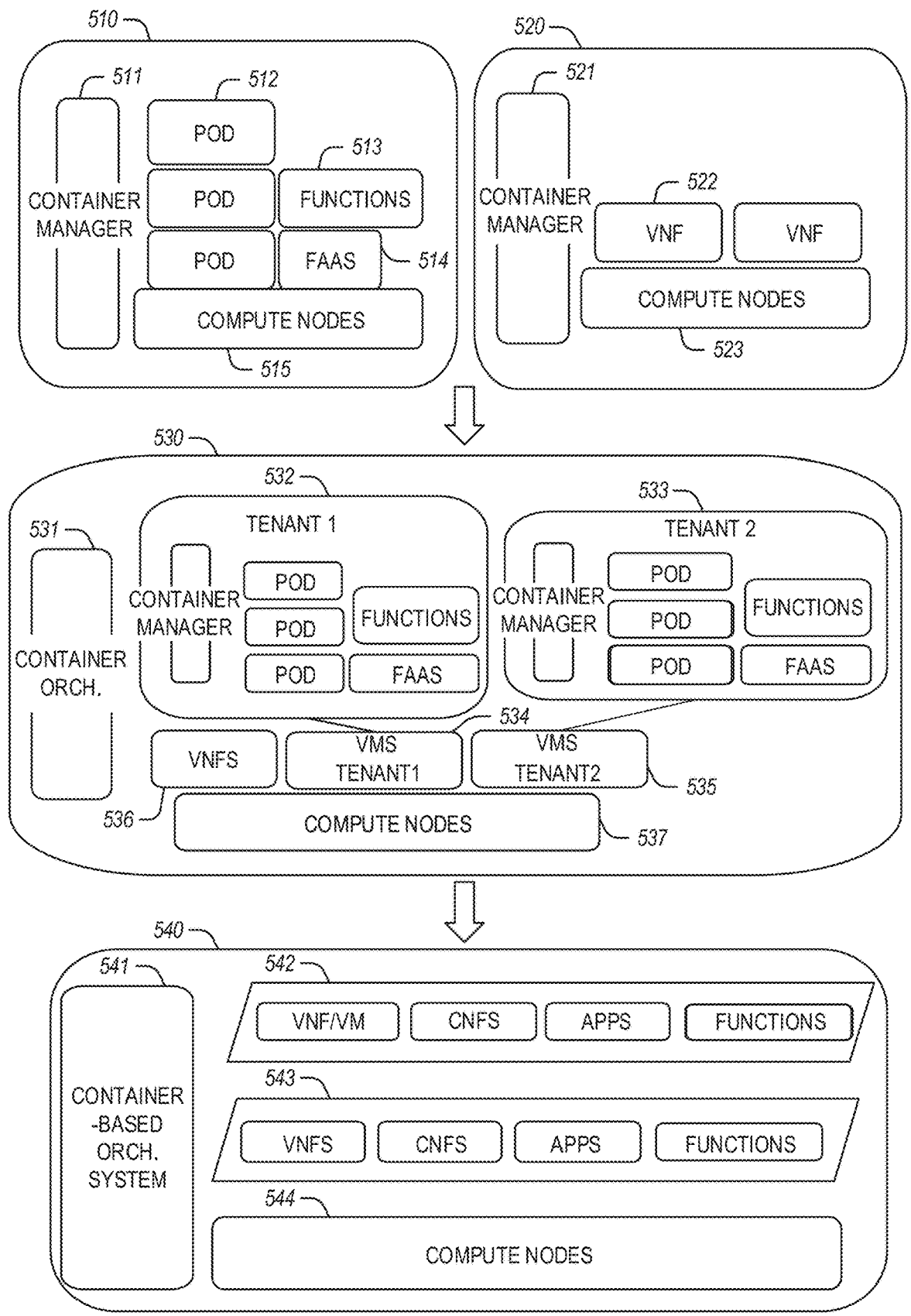
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (e.g., compute nodes 515 in arrangement 510) or to separately execute containerized virtualized network functions through execution via compute nodes (e.g., compute nodes 523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside from the execution of virtualized network functions). This arrangement is further adapted for use in system arrangement 540, which provides containers 542, 543, or execution of the various functions, applications, and functions on compute nodes 544, as coordinated by a container-based orchestration system 541.

The system arrangements depicted in FIG. 5 provide an architecture that treats VMs, Containers, and Functions equally in terms of application composition (and resulting applications are combinations of these three ingredients). Each ingredient may involve the use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include bare metal (dedicated) equipment, virtual machines, containers, virtual machines on containers, or combinations thereof.

In further examples, aspects of software-defined or controlled silicon hardware, and other configurable hardware, may integrate with the applications, functions, and services of an edge computing system. Software-defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
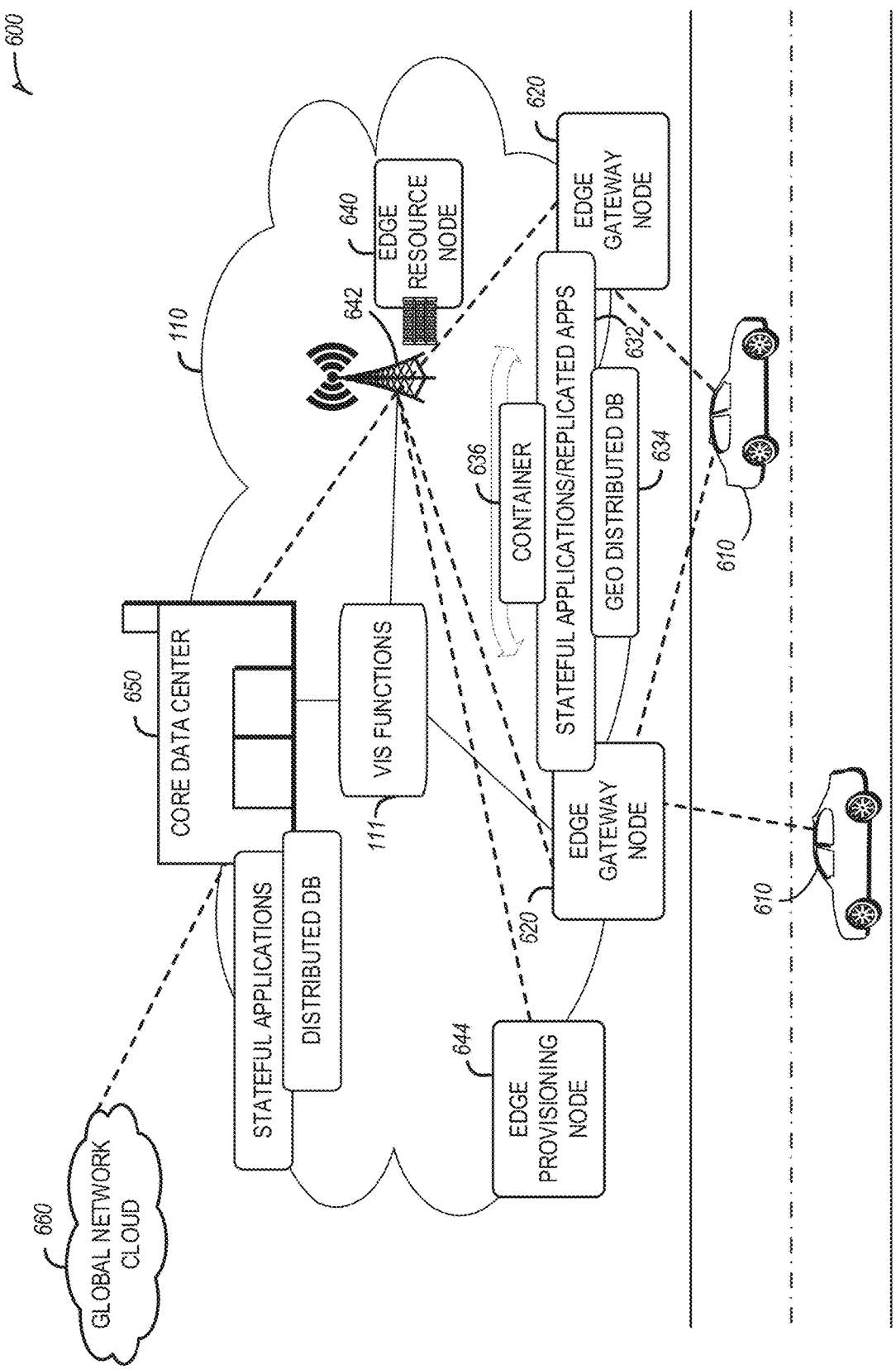
FIG. 6 illustrates a compute and communication use case involving mobile access to applications in an edge computing system using the SCF.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes (or devices) 610 may be embodied as in-vehicle compute systems (e.g., in-vehicle navigation and/or infotainment systems) located in corresponding vehicles that communicate with the edge gateway nodes (or devices) 620 during traversal of a roadway. For instance, the edge gateway nodes 620 may be located in a roadside cabinet or other enclosure built into a structure having other, separate, mechanical utility, which may be placed along the roadway, at intersections of the roadway, or other locations near the roadway. As respective vehicles traverse along the roadway, the connection between its client compute node 610 and a particular edge gateway node 620 may propagate to maintain a consistent connection and context for the client compute node 610. Likewise, MEC nodes may aggregate at the high priority services or according to the throughput or latency resolution requirements for the underlying service(s) (e.g., in the case of drones). The respective edge gateway nodes 620 include an amount of processing and storage capabilities and, as such, some processing and/or storage of data for the client compute nodes 610 may be performed on one or more of the edge gateway nodes 620.

The edge gateway nodes 620 may communicate with one or more edge resource nodes 640, which are illustratively embodied as compute servers, appliances, or components located at or in a communication base station 642 (e.g., a base station of a cellular network). As discussed above, the respective edge resource nodes 640 include an amount of processing and storage capabilities, and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway nodes 620 (depending on, for example, the capabilities of each component, or information in the request indicating urgency or importance). Based on data access, data location, or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicates with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway nodes 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the stateful applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, a prediction can be made to identify the next owner to continue, or when the data or computational access will no longer be viable. These and other services may be utilized to complete the work that is needed to keep the transaction compliant and lossless.

In further scenarios, a container 636 (or a pod of containers) may be flexibly migrated from an edge gateway node 620 to other edge nodes (e.g., 620, 640, etc.) such that the container with an application and workload does not need to be reconstituted, re-compiled, re-interpreted for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container-native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of MEC nodes, such as an edge node hosted in a vehicle (car/truck/tram/train) or other mobile units, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In an example embodiment, the edge cloud 110 in FIG. 6 utilizes VIS functions 111 in connection with disclosed techniques. The VIS functions 111 may be performed by a communication node configured as an orchestration management entity or a MEC host within a MEC network, or (2) performed by a board management controller (BMC) of a computing node. Example VIS functions are discussed in greater detail in connection with FIG. 9A-FIG. 14.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application that may be provided by a third party) is executed. The container may be any isolated execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer-readable (also referred to as machine-readable) instructions 882 of FIG. 8B, to various receiving parties for implementing any of the methods described herein. The example edge provisioning node 644 may be implemented by any computer server, home server, content delivery network, virtual server, software distribution system, central facility, storage device, storage disks, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party (or parties). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer-readable instructions 882 (also referred to as machine-readable instructions 882) of FIG. 8B. The receiving parties may be consumers, service providers, users, retailers, OEMs, etc., who purchase and/or license the software instructions for use and/or re-sale and/or sub-licensing.

In an example, the edge provisioning node 644 includes one or more servers and one or more storage devices/disks. The storage devices and/or storage disks host computer-readable instructions such as the example computer-readable instructions 882 of FIG. 8B, as described below. Similar to edge gateway nodes 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer-readable instructions 882 from the edge provisioning node 644. For example, the software instructions, which may correspond to the example computer-readable instructions 882 of FIG. 8B may be downloaded to the example processor platform/s, which is to execute the computer-readable instructions 882 to implement the methods described herein.

In some examples, the processor platform(s) that execute the computer-readable instructions 882 can be physically located in different geographic locations, legal jurisdictions, etc. In some examples, one or more servers of the edge provisioning node 644 periodically offer, transmit, and/or force updates to the software instructions (e.g., the example computer-readable instructions 882 of FIG. 8B) to ensure improvements, patches, updates, etc. are distributed and applied to the software instructions implemented at the end-user devices. In some examples, different components of the computer-readable instructions 882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 7:
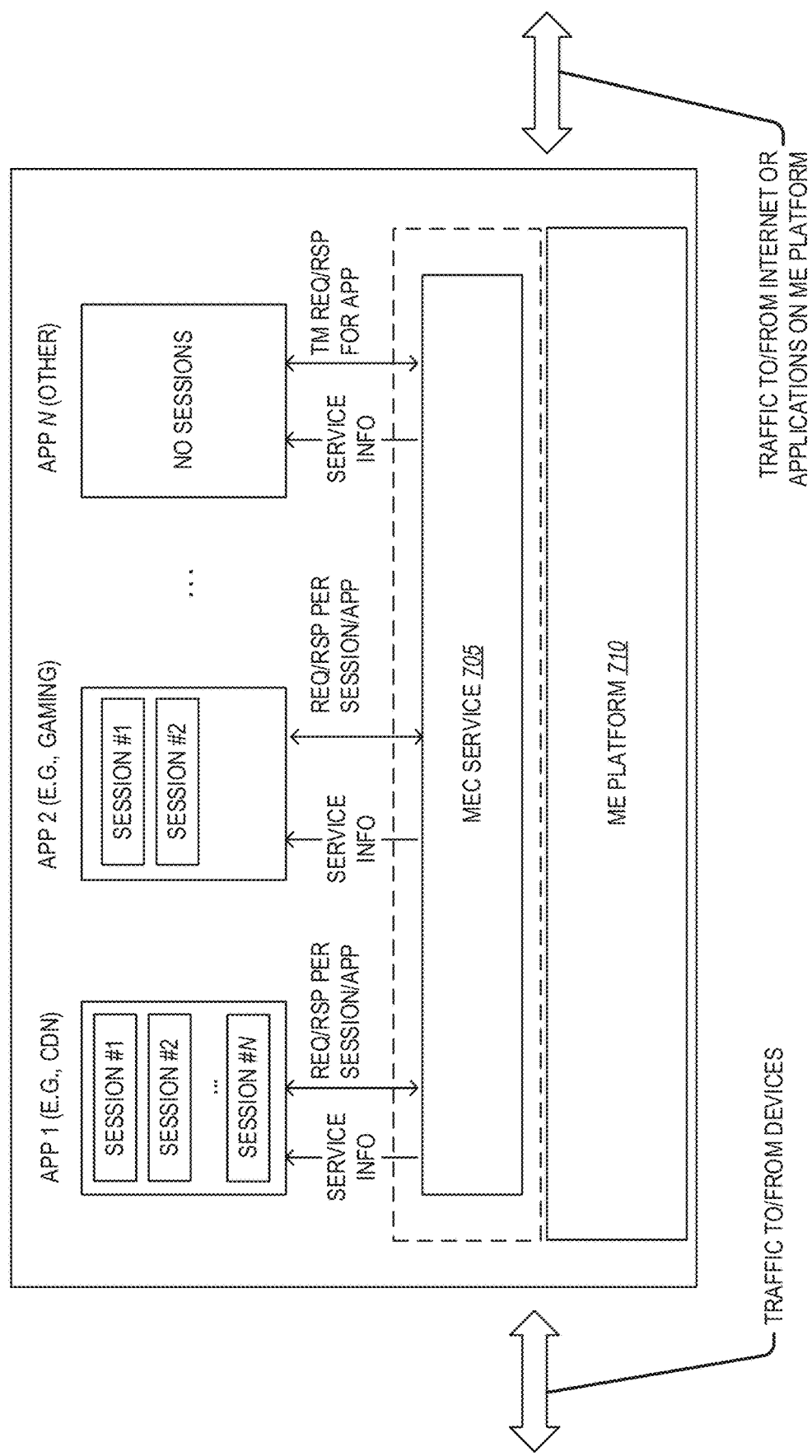
FIG. 7 illustrates a MEC service architecture 800, according to some embodiments.

FIG. 7 illustrates a MEC service architecture 700, according to some embodiments. MEC service architecture 700 includes the MEC service 705, a multi-access edge (ME) platform 710 (e.g., corresponding to MEC platform 932 in FIG. 9A), and applications (Apps) 1 to N (where N is a number). As an example, App 1 may be a content delivery network (CDN) app/service hosting 1, . . . , n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as MEC platform 710) and consumers (e.g., UEs, user apps instantiated by individual UEs, other servers/services, network functions, application functions, etc.). Each session represents an interactive information exchange between two or more elements, such as a client-side app and its corresponding server-side app, a user app instantiated by a UE, and a MEC app instantiated by the MEC platform 710, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE and a Data Network that provides a PDU connectivity service, which is a service that provides for the exchange of PDUs between a UE and a Data Network. An MA PDU session is a PDU Session that provides a PDU connectivity service, which can use one access network at a time, or simultaneously a 3GPP access network and a non-3GPP access network. Furthermore, each session may be associated with a session identifier (ID) which is data that uniquely identifies a session, and each App (or App instance) may be associated with an App ID (or App instance ID) which is data that uniquely identifies an App (or App instance).

The MEC service 705 provides one or more MEC services (e.g., MEC services 936 in FIG. 9A) to MEC service consumers (e.g., Apps 1 to N). The MEC service 705 may optionally run as part of the platform (e.g., MEC platform 710) or as an application (e.g., ME app). Different Apps 1 to N, whether managing a single instance or several sessions (e.g., CDN), may request specific service info per their requirements for the whole application instance or different requirements per session. The MEC service 705 may aggregate all the requests and act in a manner that will help optimize the BW usage and improve the Quality of Experience (QoE) for applications.

The MEC service 705 provides a MEC service API that supports both queries and subscriptions (e.g., pub/sub mechanism) that are used over a Representational State Transfer ("REST" or "RESTful") API or alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics concerning the identified request target, and responds to that request with one or more response messages. A client constructs request messages to communicate specific intentions, examines received responses to see if the intentions were carried out, and determines how to interpret the results. The target of an HTTP request is called a "resource". Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of ETSI GS MEC 009 V2.1.1 (2019 January) ("[MEC009]")). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure:

{apiRoot}/{apiName/(apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under the control of the deployment, whereas the remaining parts of the URI are under the control of the API specification. In the above root, "apiRoot" and "apiName" are discovered using the service registry (see e.g., service registry 738 in FIG. 7). It includes the scheme ("http" or "https"), host and optional port, and an optional prefix string. For a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

In further examples, any of the compute nodes or devices discussed with reference to the present edge computing systems and environment may be fulfilled based on the components depicted in FIGS. 8A and 8B. Respective edge compute nodes may be embodied as a type of device, appliance, computer, or other "thing" capable of communicating with other edges, networking, or endpoint components. For example, an edge compute device may be embodied as a personal computer, a server, a smartphone, a mobile compute device, a smart appliance, an in-vehicle compute system (e.g., a navigation system), a self-contained device having an outer case, shell, etc., or other device or system capable of performing the described functions.

Figure 8A:
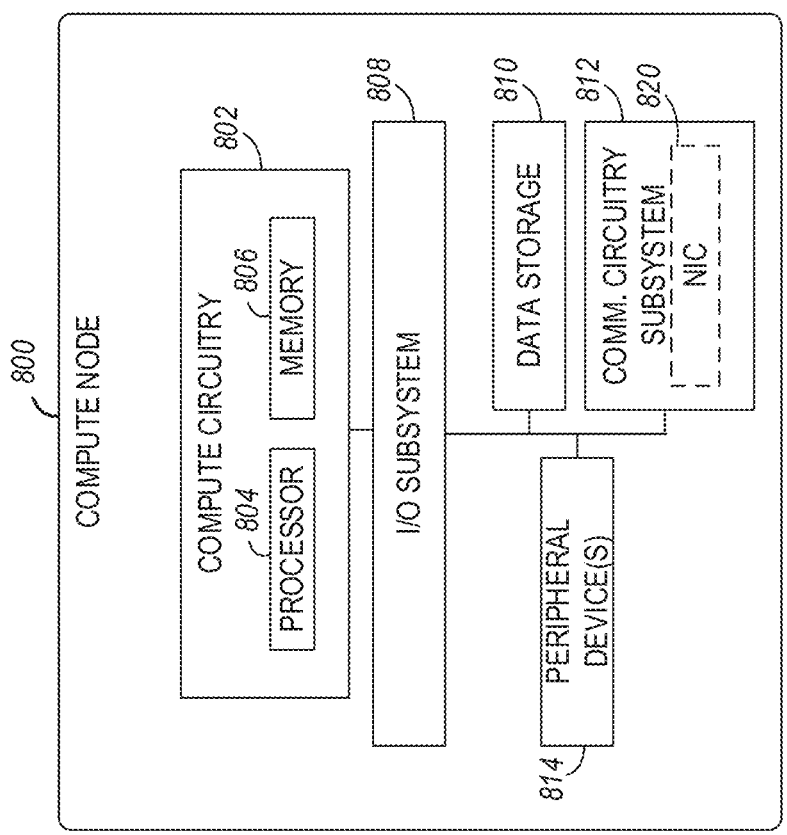
FIG. 8A provides an overview of example components for compute deployed at a compute node in an edge computing system.

In the simplified example depicted in FIG. 8A, an edge compute node 800 includes a compute engine (also referred to herein as "compute circuitry") 802, an input/output (I/O) subsystem 808, one or more data storage devices 810, a communication circuitry subsystem 812, and, optionally, one or more peripheral devices 814. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 800 may be embodied as any type of engine, device, or collection of devices capable of performing various compute functions. In some examples, the compute node 800 may be embodied as a single device such as an integrated circuit, an embedded system, a field-programmable gate array (FPGA), a system-on-a-chip (SOC), or other integrated system or device. In the illustrative example, the compute node 800 includes or is embodied as a processor 804 and a memory 806. The processor 804 may be embodied as any type of processor capable of performing the functions described herein (e.g., executing an application). For example, the processor 804 may be embodied as a multi-core processor(s), a microcontroller, a processing unit, a specialized or special purpose processing unit, or another processor or processing/controlling circuit.

In some examples, the processor 804 may be embodied as, include, or be coupled to an FPGA, an application-specific integrated circuit (ASIC), reconfigurable hardware or hardware circuitry, or other specialized hardware to facilitate the performance of the functions described herein. Also in some examples, the processor 804 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within a SOC or integrated with networking circuitry (e.g., in a SmartNIC, or enhanced SmartNIC), acceleration circuitry, storage devices, or AI hardware (e.g., GPUs, programmed FPGAs, Network Processing Units (NPUs), Infrastructure Processing Units (IPUs), Storage Processing Units (SPUs), AI Processors (APUs), Data Processing Unit (DPUs), or other specialized accelerators such as a cryptographic processing unit/accelerator). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general-purpose processing hardware. However, it will be understood that an xPU, a SOC, a CPU, and other variations of the processor 804 may work in coordination with each other to execute many types of operations and instructions within and on behalf of the compute node 800.

The memory 806 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three-dimensional crosspoint memory device (e.g., Intel® 3D XPoint™ memory), or other byte-addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross-point architecture in which memory cells sit at the intersection of word lines and bit lines and are individually addressable and in which bit storage is based on a change in bulk resistance. In some examples, all or a portion of the memory 806 may be integrated into the processor 804. The memory 806 may store various software and data used during operation such as one or more applications, data operated on by the application(s), libraries, and drivers.

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three-dimensional crosspoint memory device, or other bytes addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, a combination of any of the above, or other suitable memory. A memory device may also include a three-dimensional crosspoint memory device (e.g., Intel® 3D XPoint™ memory), or other byte-addressable write-in-place nonvolatile memory devices. The memory device may refer to the die itself and/or to a packaged memory product.

In some examples, 3D crosspoint memory (e.g., Intel® 3D XPoint™ memory) may include a transistor-less stackable cross-point architecture in which memory cells sit at the intersection of word lines and bit lines and are individually addressable and in which bit storage is based on a change in bulk resistance. In some examples, all or a portion of the memory 806 may be integrated into the processor 804. The memory 806 may store various software and data used during operation such as one or more applications, data operated on by the application(s), libraries, and drivers.

In some examples, resistor-based and/or transistor-less memory architectures include nanometer-scale phase-change memory (PCM) devices in which a volume of phase-change material resides between at least two electrodes. Portions of the example phase-change material exhibit varying degrees of crystalline phases and amorphous phases, in which varying degrees of resistance between at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods (e.g., approximately 10 years at room temperature). Write operations to example PCM devices (e.g., set to logical "0", set to logical "1", set to an intermediary resistance value) are accomplished by applying one or more current pulses to at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, the implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 802 is communicatively coupled to other components of the compute node 800 via the I/O subsystem 808, which may be embodied as circuitry and/or components to facilitate input/output operations with the compute circuitry 802 (e.g., with the processor 804 and/or the main memory 806) and other components of the compute circuitry 802. For example, the I/O subsystem 808 may be embodied as, or otherwise include memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 808 may form a portion of a system-on-a-chip (SoC) and be incorporated, along with one or more of the processor 804, the memory 806, and other components of the compute circuitry 802, into the compute circuitry 802.

One or more data storage devices 810 may be embodied as any type of device configured for short-term or long-term storage of data such as, for example, memory devices and circuits, memory cards, hard disk drives, solid-state drives, or other data storage devices. Individual data storage devices may include a system partition that stores data and firmware code for the one or more data storage devices 810. Individual data storage devices of the one or more data storage devices 810 may also include one or more operating system partitions that store data files and executables for operating systems depending on, for example, the type of compute node 800.

The communication circuitry subsystem 812 may be embodied as any communication circuit, device, or collection thereof, capable of enabling communications over a network between the compute circuitry 802 and another compute device (e.g., an edge gateway of an implementing edge computing system). The communication circuitry subsystem 812 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, an IoT protocol such as IEEE 802.15.4 or ZigBee®, low-power wide-area network (LP-WAN) or low-power wide-area (LPWA) protocols, etc.) to effect such communication.

The illustrative communication circuitry subsystem 812 includes a network interface controller (NIC) 820, which may also be referred to as a host fabric interface (HFI). The NIC 820 may be embodied as one or more add-in-boards, daughter cards, network interface cards, controller chips, chipsets, or other devices that may be used by the compute node 800 to connect with another compute device (e.g., an edge gateway node). In some examples, the NIC 820 may be embodied as part of a system-on-a-chip (SoC) that includes one or more processors or included on a multichip package that also contains one or more processors. In some examples, the NIC 820 may include a local processor (not shown) and/or a local memory (not shown) that are both local to the NIC 820. In such examples, the local processor of the NIC 820 may be capable of performing one or more of the functions of the compute circuitry 802 described herein. Additionally, or in such examples, the local memory of the NIC 820 may be integrated into one or more components of the client compute node at the board level, socket level, chip level, and/or other levels.

Additionally, in some examples, a respective compute node 800 may include one or more peripheral devices 814. Such peripheral devices 814 may include any type of peripheral device found in a compute device or server such as audio input devices, a display, other input/output devices, interface devices, and/or other peripheral devices, depending on the particular type of the compute node 800. In further examples, the compute node 800 may be embodied by a respective edge compute node (whether a client, gateway, or aggregation node) in an edge computing system or like forms of appliances, computers, subsystems, circuitry, or other components.

Figure 8B:
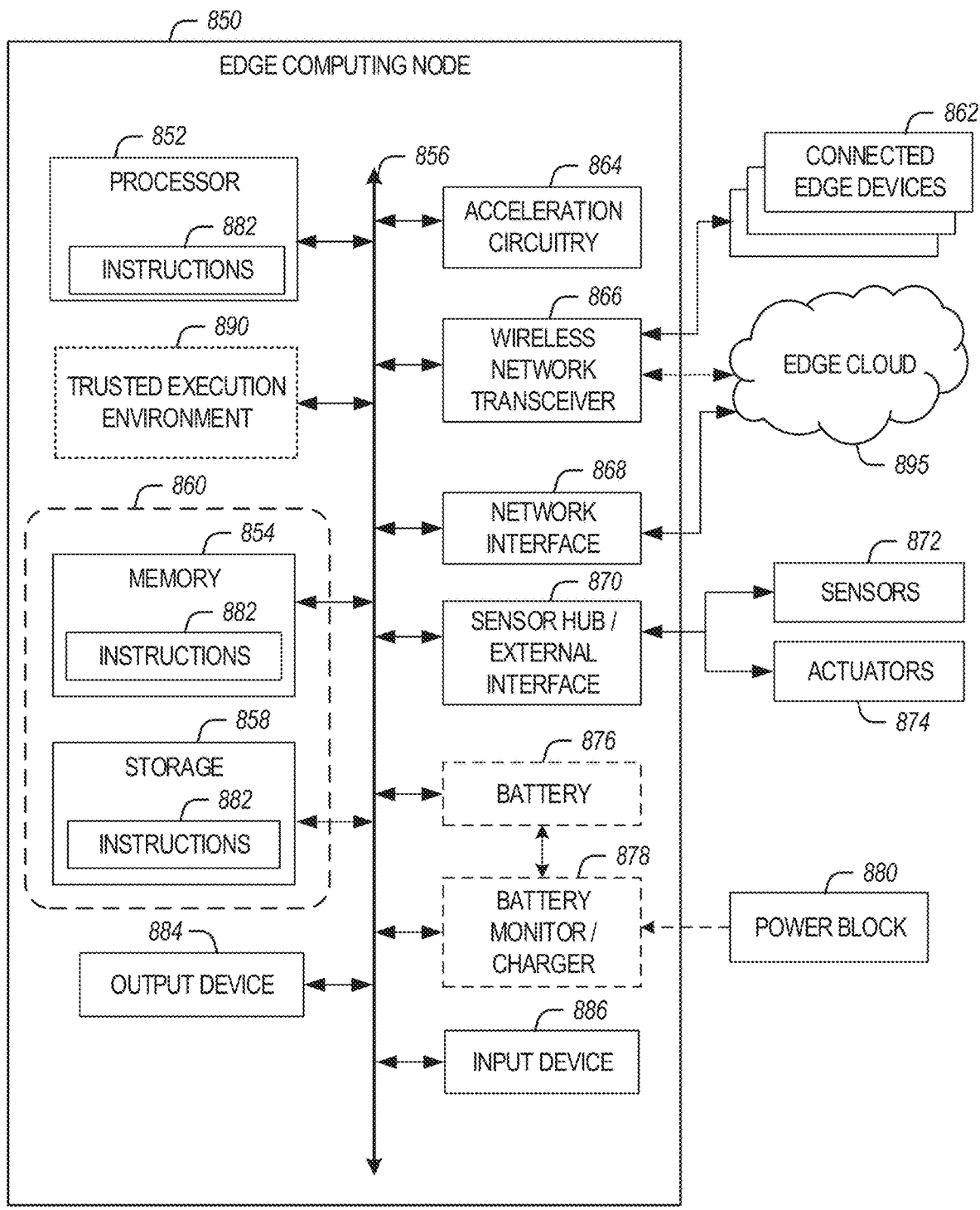
FIG. 8B provides a further overview of example components within a computing device in an edge computing system.

In a more detailed example, FIG. 8B illustrates a block diagram of an example of components that may be present in an edge computing node 850 for implementing the techniques (e.g., operations, processes, methods, and methodologies) described herein. This edge computing node 850 provides a closer view of the respective components of node 800 when implemented as or as part of a computing device (e.g., as a mobile device, a base station, server, gateway, etc.). The edge computing node 850 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 850, or as components otherwise incorporated within a chassis of a larger system.

The edge computing node 850 may include processing circuitry in the form of a processor 852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 852 may be a part of a system on a chip (SoC) in which the processor 852 and other components are formed into a single integrated circuit, or a single package, such as the Edison™ or Galileo™ SoC boards from Intel Corporation, Santa Clara, California. As an example, the processor 852 may include an Intel® Architecture Core™ based CPU processor, such as a Quark™, an Atom™, an i3, an i5, an i7, an i9, or an MCU-class processor, or another such processor available from Intel®. However, any number of other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 852 and accompanying circuitry may be provided in a single socket form factor, multiple socket form factor, or a variety of other formats, including in limited hardware configurations or configurations that include fewer than all elements shown in FIG. 8B.

The processor 852 may communicate with a system memory 854 over an interconnect 856 (e.g., a bus). Any number of memory devices may be used to provide for a given amount of system memory. As an example, the memory 854 may be random access memory (RAM) per a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP), or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems, and so forth, a storage 858 may also couple to the processor 852 via the interconnect 856. In an example, storage 858 may be implemented via a solid-state disk drive (SSDD). Other devices that may be used for the storage 858 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin-transfer torque (STT)-MRAM, a spintronic magnetic junction memory-based device, a magnetic tunneling junction (MTJ) based device, a DW (Domain Wall) and SOT (Spin-Orbit Transfer) based device, a thyristor-based memory device, or a combination of any of the above, or other memory.

In low-power implementations, the storage 858 may be on-die memory or registers associated with the processor 852. However, in some examples, storage 858 may be implemented using a micro hard disk drive (HDD). Further, any number of new technologies may be used for the storage 858 in addition to, or instead of, the technologies described, such as resistance change memories, phase change memories, holographic memories, or chemical memories, among others.

The components may communicate over the interconnect 856. The interconnect 856 may include any number of technologies, including industry-standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC-based system. Other bus systems may be included, such as an Inter-Integrated Circuit (I2C) interface, a Serial Peripheral Interface (SPI) interface, point-to-point interfaces, and a power bus, among others.

The interconnect 856 may couple the processor 852 to a transceiver 866 (e.g., a wireless network transceiver), for communications with the connected edge devices 862. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others.

Any number of radios, configured for a particular wireless communication protocol, may be used for the connections to the connected edge devices 862. For example, a wireless local area network (WLAN) unit may be used to implement Wi-Fi® communications under the Institute of Electrical and Electronics Engineers (IEEE) 802.11 standard. Also, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the edge computing node 850 may communicate with close devices, e.g., within about 10 meters, using a local transceiver based on Bluetooth Low Energy (BLE), or another low power radio, to save power. More distant connected edge devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in the edge cloud 895 via local or wide area network protocols. The wireless network transceiver 866 may be a low-power wide-area (LPWA) transceiver that follows the IEEE 802.15.4, or IEEE 802.15.4g standards, among others. The edge computing node 850 may communicate over a wide area using LoRaWAN™ (Long Range Wide Area Network) developed by Semtech and the LoRa Alliance. The techniques described herein are not limited to these technologies but may be used with any number of other cloud transceivers that implement long-range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium-speed communications and provision of network communications. The transceiver 866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 868 may be included to provide wired communication to nodes of the edge cloud 895 or other devices, such as the connected edge devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, etc.) may be embodied by such communications circuitry.

The edge computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors, global navigation system (e.g., GPS) sensors, pressure sensors, barometric pressure sensors, and the like. The sensor hub or external interface 870 further may be used to connect the edge computing node 850 to actuators 874, such as power switches, valve actuators, an audible sound generator, a visual warning device, and the like.

In some optional examples, various input/output (I/O) devices may be present within or connected to, the edge computing node 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 850. A display or console hardware, in the context of the present system, may be used to provide output and receive input of an edge computing system; to manage components or services of an edge computing system; identify a state of an edge computing component or service, or to conduct any other number of management or administration functions or service use cases.

A battery 876 may power the edge computing node 850, although, in examples in which the edge computing node 850 is mounted in a fixed location, it may have a power supply coupled to an electrical grid, or the battery may be used as a backup or for temporary capabilities. The battery 876 may be a lithium-ion battery, or a metal-air battery, such as a zinc-air battery, an aluminum-air battery, a lithium-air battery, and the like.

A battery monitor/charger 878 may be included in the edge computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 878 may communicate the information on battery 876 to the processor 852 over the interconnect 856. The battery monitor/charger 878 may also include an analog-to-digital (ADC) converter that enables the processor 852 to directly monitor the voltage of the battery 876 or the current flow from the battery 876. The battery parameters may be used to determine actions that the edge computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the edge computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in memory 854 and the storage 858, it may be understood that any of the code blocks may be replaced with hardwired circuits, for example, built into an application-specific integrated circuit (ASIC).

In an example, the instructions 882 provided via the memory 854, the storage 858, or the processor 852 may be embodied as a non-transitory, machine-readable medium 860 including code to direct the processor 852 to perform electronic operations in the Edge computing node 850. The processor 852 may access the non-transitory, machine-readable medium 860 over the interconnect 856. For instance, the non-transitory, machine-readable medium 860 may be embodied by devices described for the storage 858 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended periods, permanently, for brief instances, for temporarily buffering, and/or caching). The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium", "computer-readable medium", "machine-readable storage", and "computer-readable storage" are interchangeable. As used herein, the term "non-transitory computer-readable medium" is expressly defined to include any type of computer-readable storage device and/or storage disk and to exclude propagating signals, and to exclude transmission media.

Also in a specific example, the instructions 882 on the processor 852 (separately, or in combination with the instructions 882 of the machine-readable medium 860) may configure execution or operation of a trusted execution environment (TEE) 890. In an example, the TEE 890 operates as a protected area accessible to processor 852 for secure execution of instructions and secure access to data. Various implementations of the TEE 890, and an accompanying secure area in the processor 852 or the memory 854 may be provided, for instance, through the use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in edge computing node 850 through the TEE 890 and the processor 852.

While the illustrated examples of FIG. 8A and FIG. 8B include example components for a compute node and a computing device, respectively, examples disclosed herein are not limited thereto. As used herein, a "computer" may include some or all of the example components of FIGS. 8A and/or 8B in different types of computing environments. Example computing environments include Edge computing devices (e.g., Edge computers) in a distributed networking arrangement such that particular ones of participating Edge computing devices are heterogeneous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. 8A and/or 8B, each of which may include different sub-components, different memory capacities, I/O capabilities, etc. For example, because some implementations of distributed networking and/or distributed computing are associated with particular desired functionality, examples disclosed herein include different combinations of components illustrated in FIGS. 8A and/or 8B to satisfy functional objectives of distributed computing tasks. In some examples, the term "compute node" or "computer" only includes the example processor 804, memory 806, and I/O subsystem 808 of FIG. 8A. In some examples, one or more objective functions of a distributed computing task(s) rely on one or more alternate devices/structure located in different parts of an Edge networking environment, such as devices to accommodate data storage (e.g., the one or more data storage devices 810), input/output capabilities (e.g., the example peripheral device(s) 814), and/or network communication capabilities (e.g., the example NIC 820).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. 8A and 8B, such computers satisfy execution of distributed computing objective functions without including computing structure that would otherwise be unused and/or underutilized. As such, the term "computer" as used herein includes any combination of the structure of FIGS. 8A and/or 8B that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated given their ability to process one or more tasks of the distributed computing request(s), such that any computer capable of satisfying the tasks proceeds with such computing activity.

In the illustrated examples of FIGS. 8A and 8B, computing devices include operating systems. As used herein, an "operating system" is software to control example computing devices, such as the example Edge compute node 800 of FIG. 8A and/or the example Edge compute node 850 of FIG. 8B. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

In further examples, a non-transitory machine-readable medium (e.g., a computer-readable medium) also includes any medium (e.g., storage device, storage disk, etc.) that is capable of storing, encoding, or carrying instructions for execution by a machine and that cause the machine to perform any one or more of the methodologies of the present disclosure or that is capable of storing, encoding or carrying data structures utilized by or associated with such instructions. A "non-transitory machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks (e.g., SSDs); magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. As used herein, the term non-transitory computer-readable medium is expressly defined to include any type of computer-readable storage device and/or storage disk and to exclude propagating signals, and to exclude transmission media. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 8C:
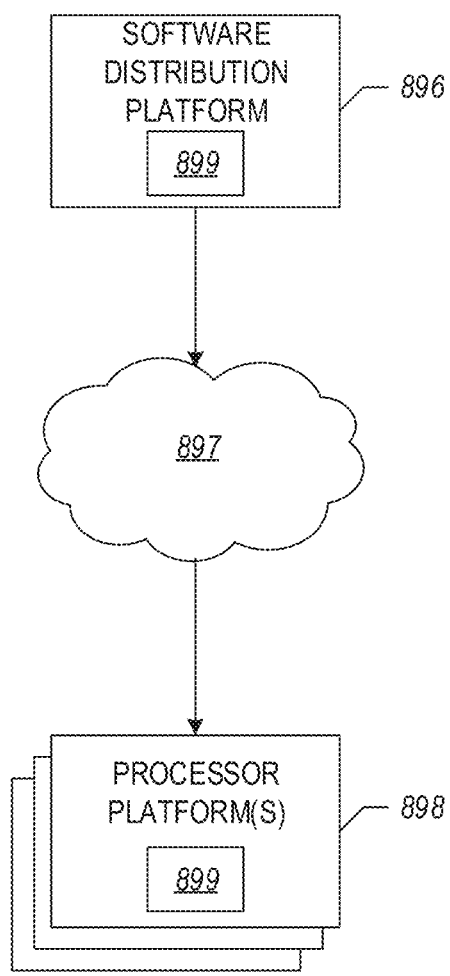
FIG. 8C illustrates a software distribution platform, according to some embodiments.

FIG. 8C illustrates an example software distribution platform 896 to distribute software, such as the example computer-readable instructions 899, to one or more devices, such as processor platform(s) 898 and/or example connected edge devices 862 of FIG. 8B. The example software distribution platform 896 may be implemented by any computer server, data facility, cloud service, etc., capable of storing and transmitting software to other computing devices (e.g., third parties, the example connected edge devices 862 of FIG. 8B). Example connected edge devices may be customers, clients, managing devices (e.g., servers), third parties (e.g., customers of an entity owning and/or operating the software distribution platform 896). Example connected edge devices may operate in commercial and/or home automation environments. In some examples, a third party is a developer, a seller, and/or a licensor of software such as the example computer-readable instructions 899. The third parties may be consumers, users, retailers, OEMs, etc. that purchase and/or license the software for use and/or re-sale and/or sub-licensing. In some examples, distributed software causes the display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 8C, the software distribution platform 896 includes one or more servers and one or more storage devices. The storage devices store the computer-readable instructions 899, which may correspond to the example computer-readable instructions 882 of FIG. 8B, as described above. The one or more servers of the example software distribution platform 896 are in communication with a network 897, which may correspond to any one or more of the Internet and/or any of the example networks described herein. In some examples, the one or more servers are responsive to requests to transmit the software to a requesting party as part of a commercial transaction. Payment for the delivery, sale, and/or license of the software may be handled by the one or more servers of the software distribution platform and/or via a third-party payment entity. The servers enable purchasers and/or licensors to download the computer-readable instructions 899 from the software distribution platform 896. For example, the software, which may correspond to the example computer-readable instructions 882 of FIG. 8B, may be downloaded to the example processor platform(s) 898 (e.g., example connected edge devices), which is/are to execute the computer-readable instructions 899 to implement the techniques discussed herein. In some examples, one or more servers of the software distribution platform 896 are communicatively connected to one or more security domains and/or security devices through which requests and transmissions of the example computer-readable instructions 899 must pass. In some examples, one or more servers of the software distribution platform 896 periodically offer, transmit, and/or force updates to the software (e.g., the example computer-readable instructions 882 of FIG. 8B which can be the same as the computer-readable instructions 899) to ensure improvements, patches, updates, etc. are distributed and applied to the software at the end-user devices.

In the illustrated example of FIG. 8C, the computer-readable instructions 899 are stored on storage devices of the software distribution platform 896 in a particular format. A format of computer-readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer-readable instructions 899 stored in the software distribution platform 896 are in a first format when transmitted to the example processor platform(s) 896. In some examples, the first format is an executable binary in which particular types of the processor platform(s) 898 can execute. However, in some examples, the first format is uncompiled code that requires one or more preparation tasks to transform the first format to a second format to enable execution on the example processor platform(s) 898. For instance, the receiving processor platform(s) 898 may need to compile the computer-readable instructions 899 in the first format to generate executable code in a second format that is capable of being executed on the processor platform(s) 898. In still other examples, the first format is interpreted code that, upon reaching the processor platform(s) 898, is interpreted by an interpreter to facilitate the execution of instructions.

Figure 9A:
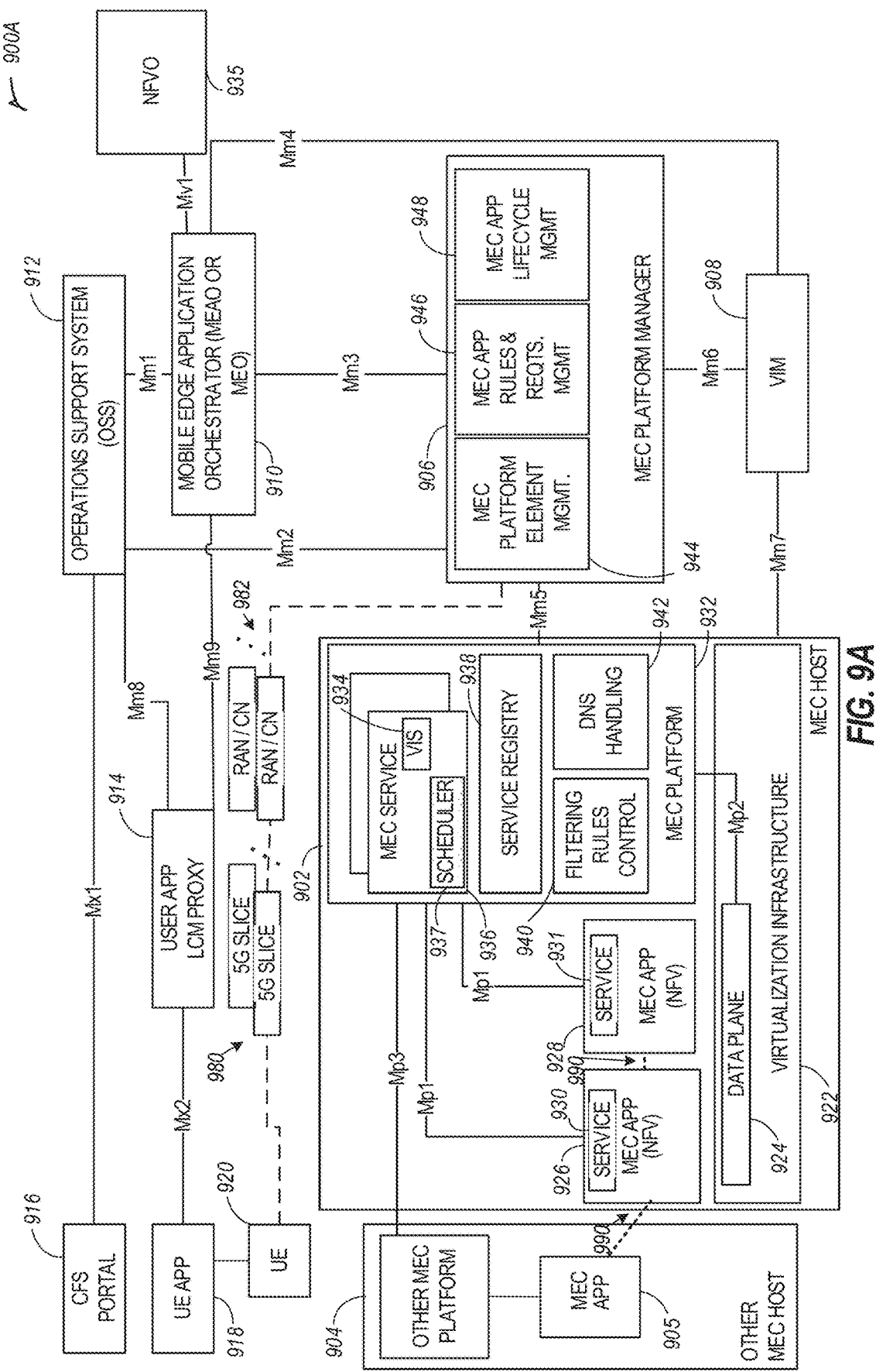
FIG. 9A illustrates a MEC network architecture with MEC V2X API interoperability support for multiple V2X message brokers, according to an example embodiment.

FIG. 9A illustrates a MEC network architecture with MEC V2X API interoperability support for multiple V2X message brokers, according to an example embodiment. FIG. 9A specifically illustrates a MEC architecture 900A with MEC hosts 902 and 904 providing functionalities per one or more ETSI MEC specifications (e.g., ETSI GS MEC 003, ETSI GS MEC 011, and ETSI GS MEC 030 specifications). Specifically, enhancements to the MEC platform 932 (e.g., as discussed in connection with FIGS. 10-14), as well as V2X message signaling (e.g., V2X message subscription signaling and V2X message publication signaling), can be used for providing the MEC V2X API interoperability support within the MEC architecture 900A.

Referring to FIG. 9A, the MEC architecture 900A includes MEC hosts 902 and 904, a virtualization infrastructure manager (VIM) 908, a MEC platform manager 906 (also referred to as Mobile Edge Platform Manager or MEPM), a Mobile Edge Application Orchestrator (MEAO)

(also referred to as a MEC orchestrator or MEO) 910, an operations support system (OSS) 912, a user app proxy 914, a UE app 918 running on UE 920, and CFS portal 916. The MEC host 902 can include a MEC platform 932 with filtering rules control module 940, a DNS handling module 942, service registry 938, and MEC services 936. The MEC host 904 can include resources used to instantiate MEC apps 905. The MEC services 936 can include at least one scheduler 937, which can be used to select resources for instantiating MEC apps (or NFVs) 926 and 928 upon virtualization infrastructure 922 that includes a data plane 924. The MEC services 936 further include a VIS 934 which is discussed in greater detail in connection with FIGS. 2-5 herein. In some embodiments, the VIS 934 is configured to perform protocol conversion functions and data forwarding functions used for providing MEC V2X API interoperability support for multiple V2X message brokers in the MEC architecture 900A.

The MEC apps 926 and 928 can be configured to provide services 930/931, which can include processing network communications traffic of different types associated with one or more wireless connections. In some embodiments, the services 930/931 include message broker services configured to support multiple application layer protocols used in the collection/distribution of data from/to multiple data sources across different MNOs. In this regard, services 930/931 provided by MEC apps can also be referred to as V2X message brokers. In other embodiments, MEC apps 926 and 928 are used for V2X message subscription (e.g., to subscribe to V2X messages distributed from V2X message brokers) and V2X message publication (e.g., to publish data to V2X message brokers which can be distributed to V2X message subscribers).

In some embodiments, a first MEC app (e.g., MEC app 905 in MEC host 904) can be configured as a V2X message broker, while a second MEC app (e.g., MEC app 926 in MEC host 902) can be configured as a MEC V2X message service subscriber/consumer. In this case, a communication link (e.g., a direct data connection) 990 may be established between two separate MEC apps (e.g., MEC apps instantiated in two or more different MEC hosts or MEC apps instantiated in the same MEC host). In this regard, the V2X message broker can also be referred to as a service-producing MEC app.

In other aspects, the V2X message broker may be configured as a registered service of the MEC platform 932, as a producer of V2X messages. In other words, the message broker is part of a MEC platform's service registry. In this case, communication with a MEC app requesting a subscription to a V2X messaging service is achieved, within the same MEC host, via the Mp1 interface and the connection to a common MEC platform. When the message broker service and the requestor MEC app are instantiated at different MEC hosts of the same MEC system, communication with a MEC app in another MEC host (in the same or different MNO) is achieved via the Mp3 interface (e.g., using a connection between MEC platforms in different MEC hosts). In case these different MEC hosts belong to different MEC systems of a MEC federation, then, instead of Mp3, MEC federation reference points are involved in this communication.

In some aspects, the message broker is a service-producing MEC application, either instantiated at the same MEC host as the MEC app requesting a subscription to V2X messages, or at another MEC host of the same or of another MEC system. In the case of different locality (e.g., different MEC hosts), the Mp1 and Mp3/MEC federation interfaces are involved in communication. In the case of the same locality (e.g., the same MEC host), the Mp1 interface will be only involved.

The MEC platform manager 906 can include MEC platform element management module 944, MEC app rules and requirements management module 946, and MEC app lifecycle management module 948.

In some aspects, UE 920 can be configured to communicate to one or more of the core networks 982 via one or more of the network slice instances (NSIs) 980. In some aspects, the core networks 982 can use slice management functions to dynamically configure NSIs 980, including dynamically assigning a slice to a UE, configuring network functions associated with the slice, configuring a MEC app for communicating data using the slice, reassigning a slice to a UE, dynamically allocate or reallocate resources used by one or more of the NSIs 980, or other slice related management functions. One or more of the functions performed in connection with slice management can be initiated based on user requests (e.g., via a UE), based on a request by a service provider, or maybe triggered automatically in connection with an existing Service Level Agreement (SLA) specifying slice-related performance objectives.

Figure 9B:
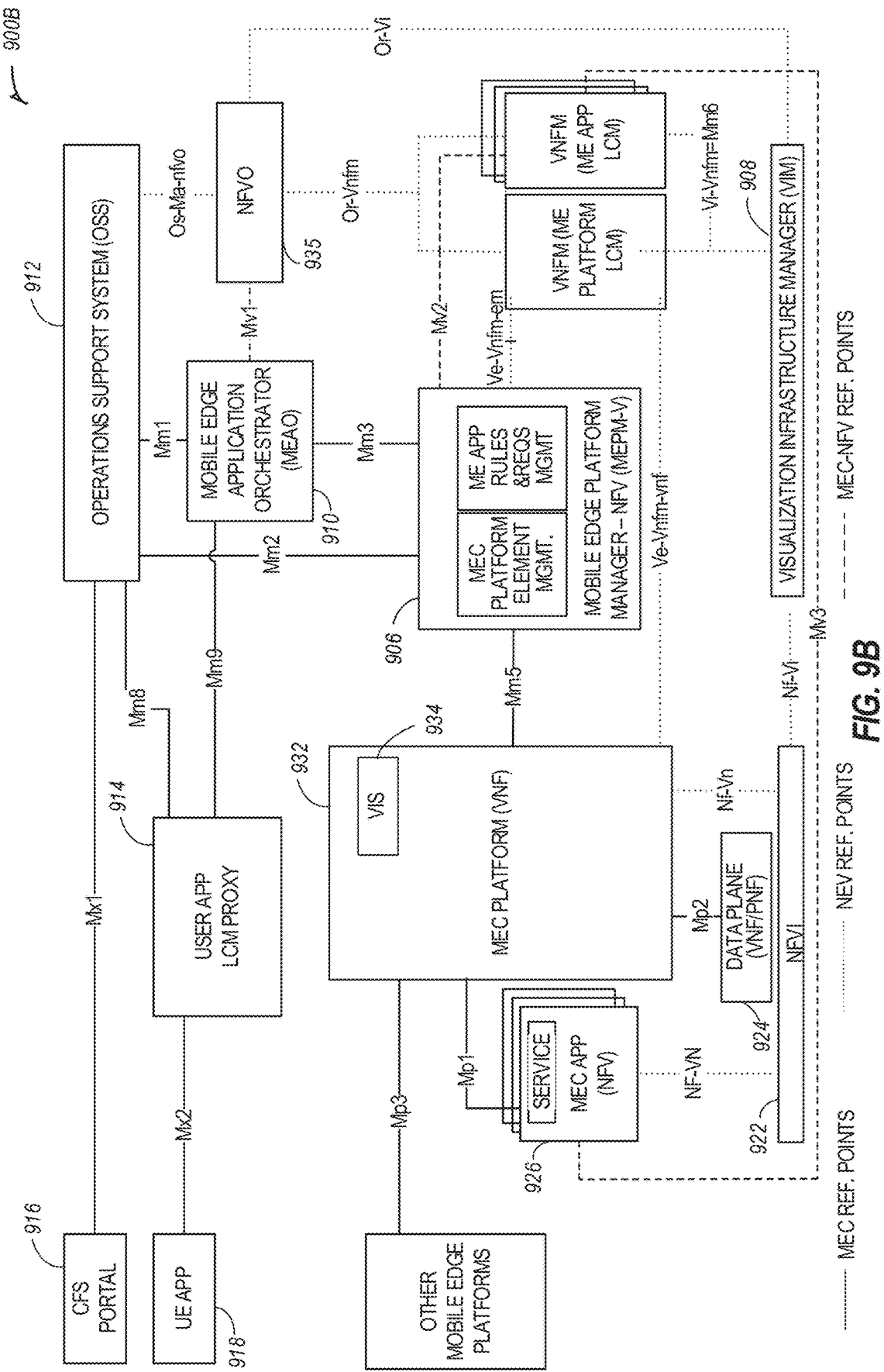
FIG. 9B illustrates a MEC reference architecture in a Network Function Virtualization (NFV) environment, according to an example embodiment.

FIG. 9B illustrates a MEC reference architecture 900B in a Network Function Virtualization (NFV) environment, according to an example. The MEC architecture 900B can be configured to provide functionalities according to an ETSI MEC specification, such as the ETSI GR MEC 017 specification.

In some aspects, ETSI MEC can be deployed in an NFV environment as illustrated in FIG. 9B which can also utilize MEC V2X API interoperability support for multiple V2X message brokers in a MEC infrastructure. In some aspects, the MEC platform is deployed as a virtualized network function (VNF). The MEC applications can appear like VNFs towards the ETSI NFV Management and Orchestration (MANO) components (e.g., VIM 908, MEAO 910, and network function virtualization orchestrator or NFVO 935). This allows the re-use of ETSI NFV MANO functionality. In some aspects, the full set of MANO functionality may be unused and certain additional functionality may be needed. Such a specific MEC application is denoted by the name "MEC app VNF" (or ME app VNF) as discussed herein. In some aspects, the virtualization infrastructure is deployed as an NFVI and its virtualized resources are managed by the virtualized infrastructure manager (VIM). For that purpose, one or more of the procedures defined by ETSI NFV Infrastructure specifications (e.g., ETSI GS NFV-INF 003, ETSI GS NFV-INF 004, and ETSI GS NFV-INF 005) can be used.

In some aspects, the MEC app VNFs will be managed like individual VNFs, allowing that a MEC-in-NFV deployment can delegate certain orchestration and Life Cycle Management (LCM) tasks to the NFVO and VNFM functional blocks, as defined by ETSI NFV MANO. In some embodiments, the MEC app VNF can be configured as a V2X message broker or as a V2X app that consumes V2X services in a MEC architecture (e.g., V2X message subscription services provided by V2X message brokers from different MNOs).

In some aspects, the Mobile Edge Platform Manager (MEPM) 906 can be transformed into a "Mobile Edge Platform Manager-NFV" (MEPM-V) that delegates the LCM part to one or more virtual network function managers (VNFM(s)). The Mobile Edge Orchestrator (MEO), as defined in the MEC reference architecture ETSI GS MEC-003, can be transformed into a "Mobile Edge Application Orchestrator" (MEAO) 910 that uses the NFVO 935 for resource orchestration, and orchestration of the set of MEC app VNFs as one or more NFV Network Services (NSs). In some embodiments, the MEAO 910 and the MEPM 906 can be configured to perform federation management functions, including communication between MEC systems in a federated MEC network.

In some aspects, the Mobile Edge Platform VNF, the MEPM-V, and the VNFM (MEC platform LCM) can be deployed as a single package as per the ensemble concept in 3GPP TR 32.842, or that the VNFM is a Generic VNFM as per ETSI GS NFV-IFA 009 and the Mobile Edge Platform VNF and the MEPM-V are provided by a single vendor.

In some aspects, the Mp1 reference point between a MEC application and the MEC platform can be optional for the MEC application, unless it is an application that provides and/or consumes a MEC service. Various MEC-related interfaces and reference points discussed herein are further defined in the following ETSI-related technical specifications: ETSI GS MEC-003 and ETSI GR MEC-024 specifications.

The Mp1 reference point is a reference point between the MEC platform and the MEC applications. The Mp1 reference point provides service registration, service discovery, and communication support for services. It also provides other functionality such as application availability, session state relocation support procedures, traffic rules, and DNS rules activation, access to persistent storage and time of day information, etc. This reference point can be used for consuming and providing service-specific functionality.

The Mp2 reference point is a reference point between the MEC platform and the data plane of the virtualization infrastructure. The Mp2 reference point is used to instruct the data plane on how to route traffic among applications, networks, services, etc.

The Mp3 reference point is a reference point between MEC platforms and it is used for control communication between MEC platforms.

In some aspects, the Mm3 reference point between the MEAO 910 and the MEPM-V 906 is based on the Mm3 reference point, as defined by ETSI GS MEC 003. Changes may be configured to this reference point to cater to the split between MEPM-V and VNFM (MEC applications LCM).

In some aspects, the following new reference points (Mv1, Mv2, and Mv3) are introduced between elements of the ETSI MEC architecture and the ETSI NFV architecture to support the management of MEC app VNFs. The following reference points are related to existing NFV reference points, but only a subset of the functionality may be used for ETSI MEC, and extensions may be necessary: Mv1 (this reference point connects the MEAO and the NFVO; it is related to the Os-Ma-nfvo reference point, as defined in ETSI NFV); Mv2 (this reference point connects the VNF Manager that performs the LCM of the MEC app VNFs with the MEPM-V to allow LCM related notifications to be exchanged between these entities; it is related to the Ve-Vnfm-em reference point as defined in ETSI NFV, but may include additions, and might not use all functionality offered by Ve-Vnfm-em); Mv3 (this reference point connects the VNF Manager with the MEC app VNF instance, to allow the exchange of messages e.g. related to MEC application LCM or initial deployment-specific configuration; it is related to the Ve-Vnfm-vnf reference point, as defined in ETSI NFV, but may include additions, and might not use all functionality offered by Ve-Vnfm-vnf.

In some aspects, the following reference points are used as they are defined by ETSI NFV: Nf-Vn (this reference point connects each MEC app VNF with the NFVI); Nf-Vi (this reference point connects the NFVI and the VIM); Os-Ma-nfvo (this reference point connects the OSS and the NFVO. It is primarily used to manage NSs, i.e. several VNFs connected and orchestrated to deliver a service); Or-Vnfm (this reference point connects the NFVO and the VNFM; it is primarily used for the NFVO to invoke VNF LCM operations); Vi-Vnfm (this reference point connects the VIM and the VNFM; it is primarily used by the VNFM to invoke resource management operations to manage the cloud resources that are needed by the VNF; it is assumed in an NFV-based MEC deployment that this reference point corresponds 1:1 to Mm6); and Or-Vi (this reference point connects the NFVO and the VIM; it is primarily used by the NFVO to manage cloud resources capacity).

Figure 9C:
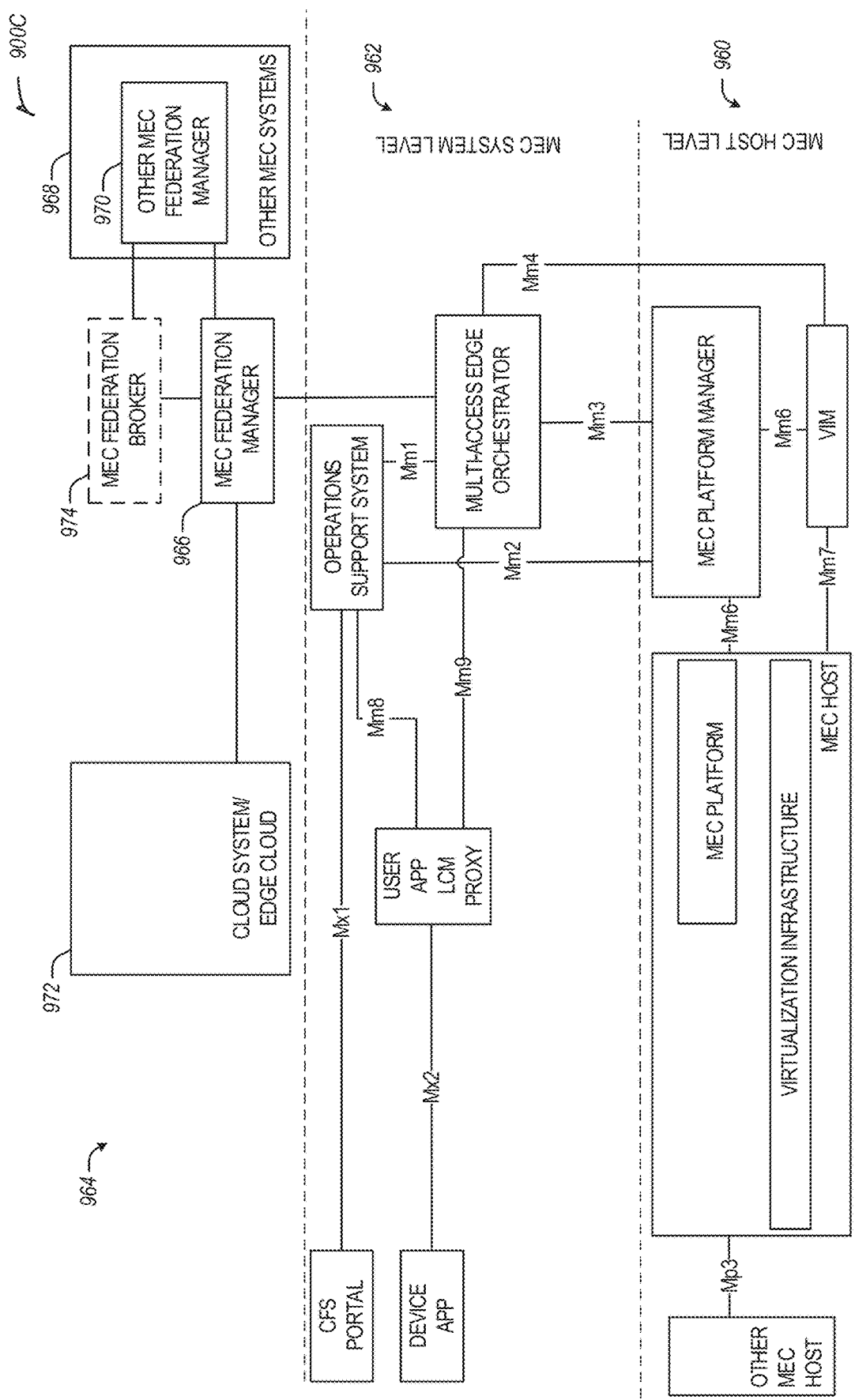
FIG. 9C illustrates a variant of the MEC network architecture of FIG. 9A configured with MEC federation, according to an example embodiment.

FIG. 9C illustrates a MEC architecture 900C that is a variant of the MEC network architecture of FIG. 9A configured with MEC federation, according to an example embodiment. Referring to FIG. 9C, the MEC host level 960, and the MEC system level 962 of the MEC architecture 900C are the same as the corresponding MEC host and system levels of the MEC architecture 900A in FIG. 9A. The MEC architecture 900C further includes a MEC federation level 964 with a MEC federation manager 966 configured to manage multiple MEC architectures (or MEC systems). In this regard, the MEC federation manager 966 in FIG. 9C manages the MEC architecture (or system) 900C and one or more additional MEC systems 968 (referenced in FIG. 9C as "Other MEC Systems"). The one or more additional MEC systems 968 may be managed by the Other MEC Federation Manager 970, which is communicatively coupled to the MEC federation manager 966 via an Mff-fed reference point. The MEC federation manager 966 in the MEC federation level 964 is further communicatively coupled via an Mff-fed reference point to a Cloud System (or Edge Cloud) 972. The MEC federation manager 966 and the Other MEC federation manager 970 may be communicatively coupled to a MEC federation broker 974 via corresponding Mfb-fed reference points.

Figure 10:
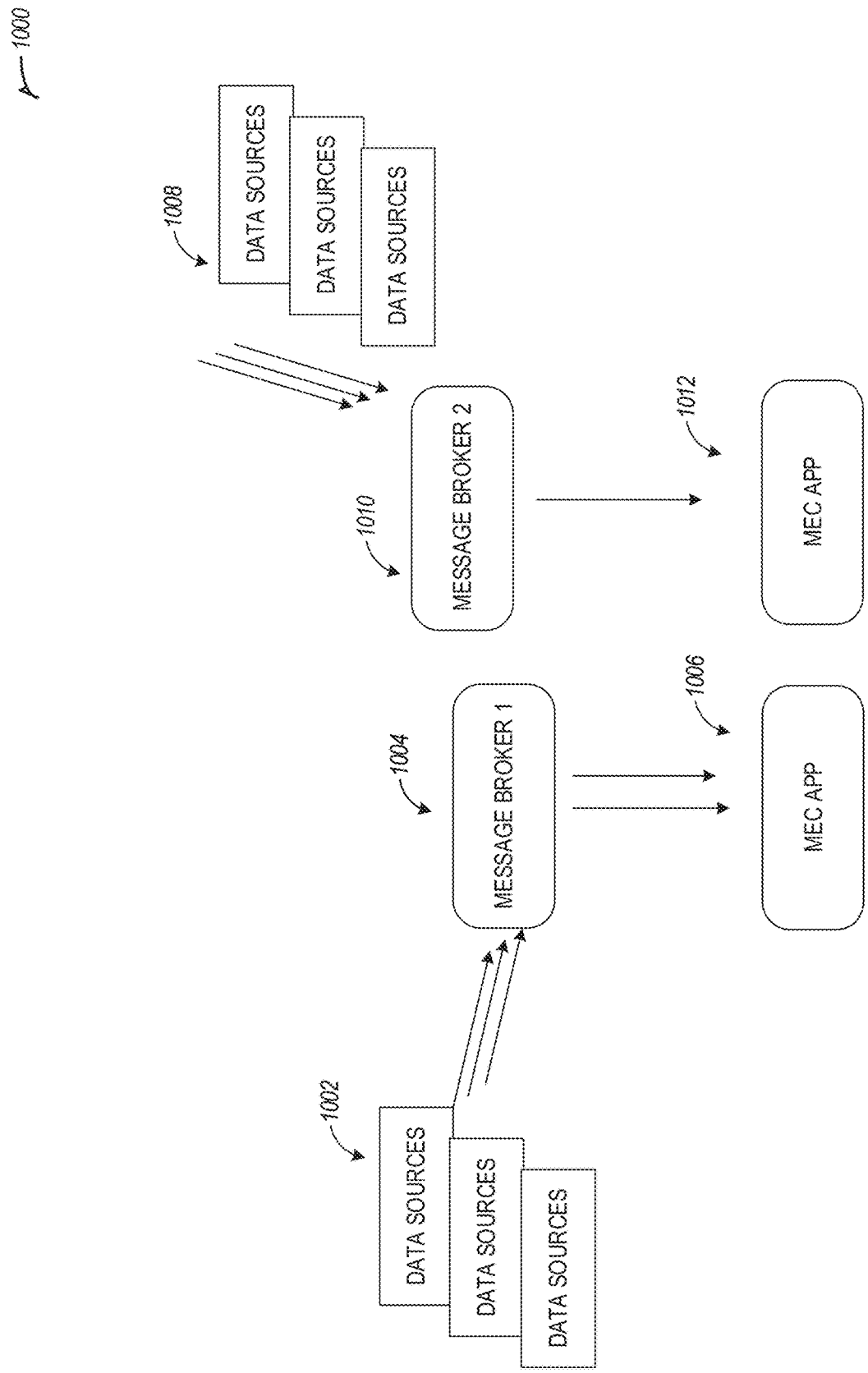
FIG. 10 illustrates the role of message brokers as part of an environment including multiple data sources of multiple mobile network operators (MNOs) in a MEC infrastructure, according to an example embodiment.

FIG. 10 illustrates the role of message brokers as part of a communication environment including multiple data sources of multiple mobile network operators (MNOs) in a MEC infrastructure 1000, according to an example embodiment. Referring to FIG. 10, the MEC infrastructure 1000 includes multiple MEC apps 1006, 1012 in communication with corresponding message brokers 1004, 1010. In some aspects, MEC apps 1006 and 1012 are associated with different MNOs and can be configured to use the same or different application layer protocols.

In example communication scenarios, such as communications associated with a Smart City, multiple message brokers 1004, 1010 can exist and can be configured to support multiple application layer protocols. In some embodiments, a message broker is used to collect data from multiple data sources 1002, 1008 across different MNOs in the MEC infrastructure 1000.

Figure 11:
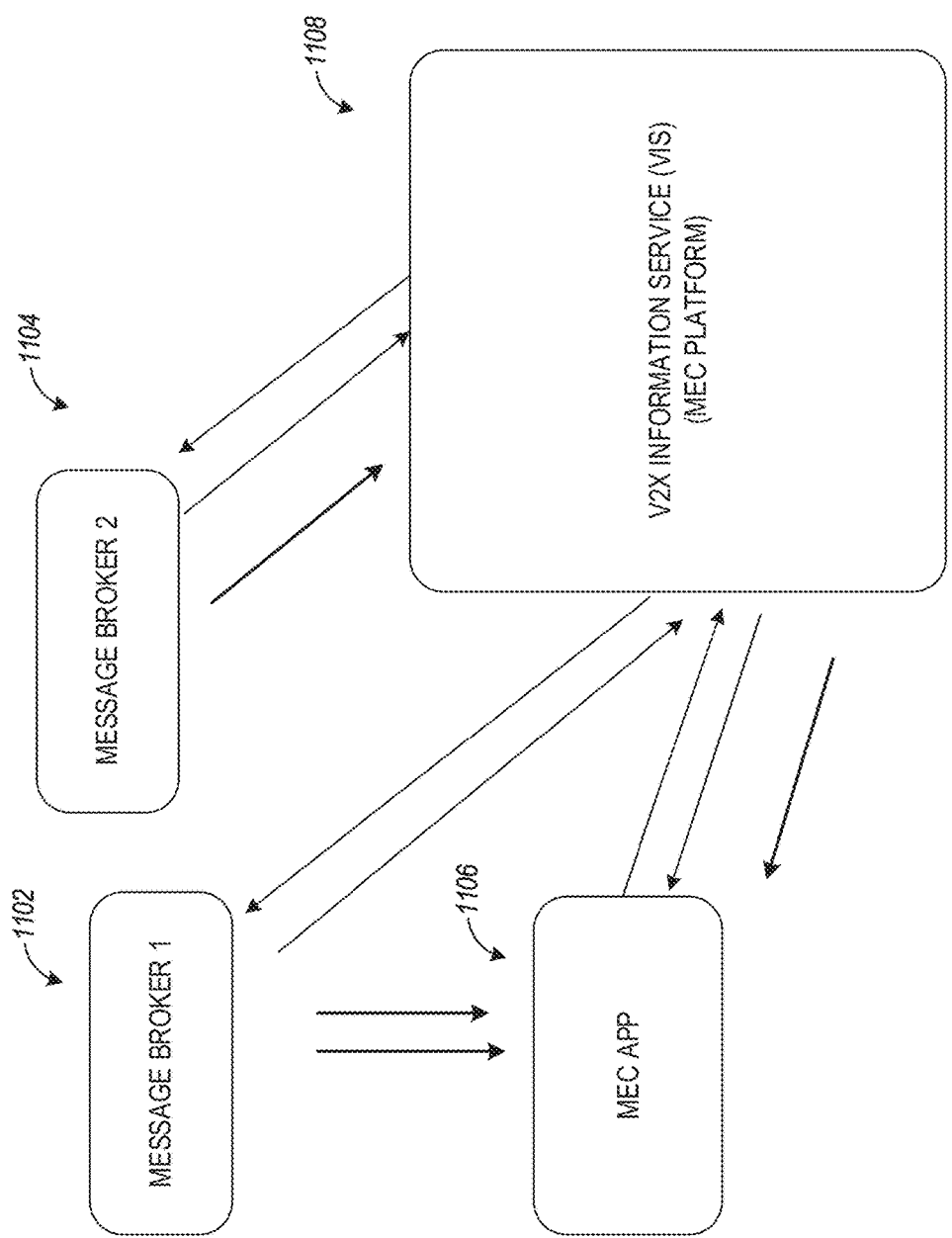
FIG. 11 illustrates multiple message brokers and their signaling interactions (direct or indirect) with a MEC application (app) consuming V2X messages as well as with a MEC platform with a V2X information service (VIS), according to an example embodiment.
Figure 12:
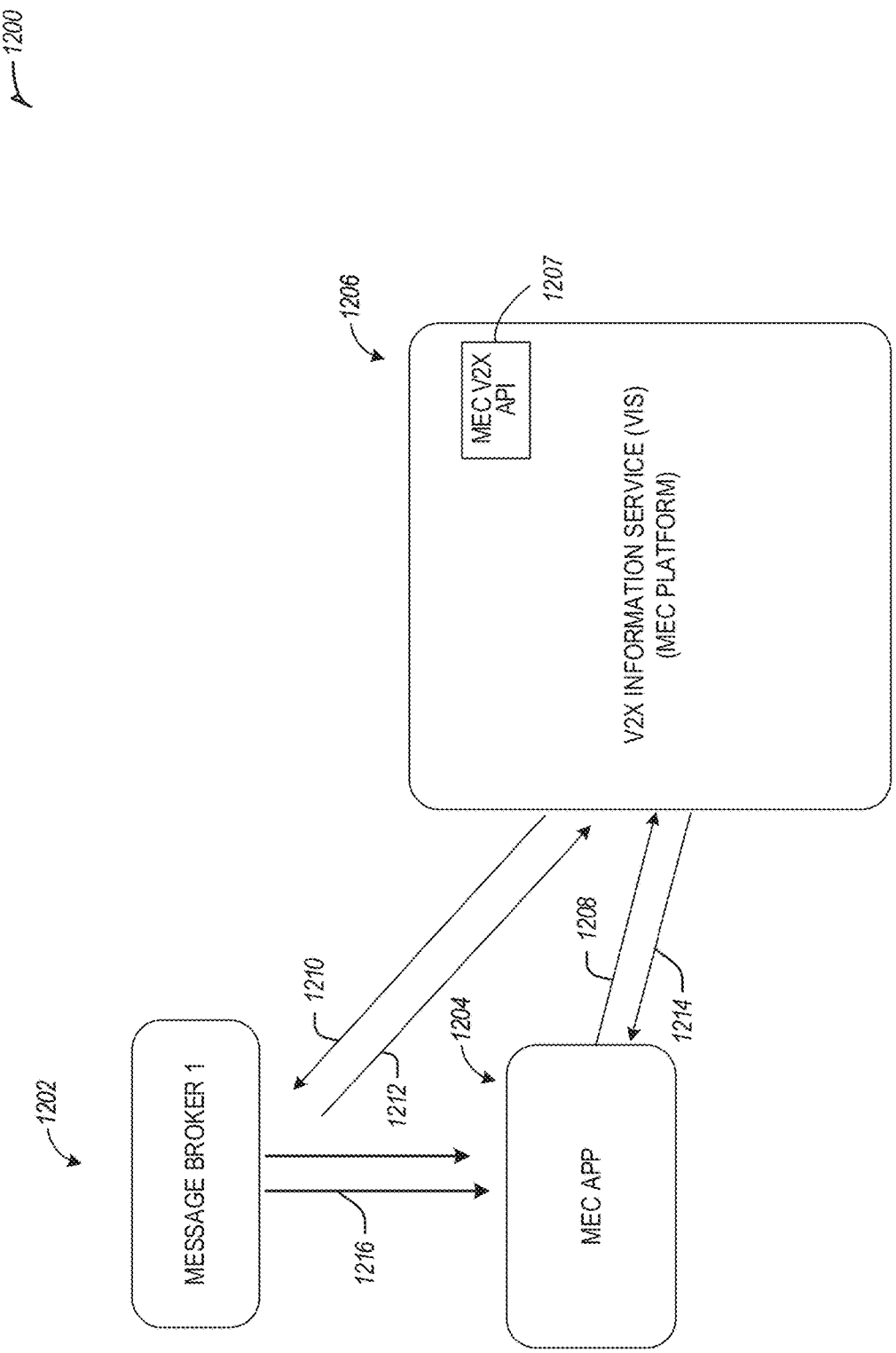
FIG. 12 illustrates an example signaling flow which may be performed when at least one of the available message brokers support the same application layer protocol (and its version) as the MEC app sending a request to subscribe to V2X messages, according to an example embodiment.
Figure 13:
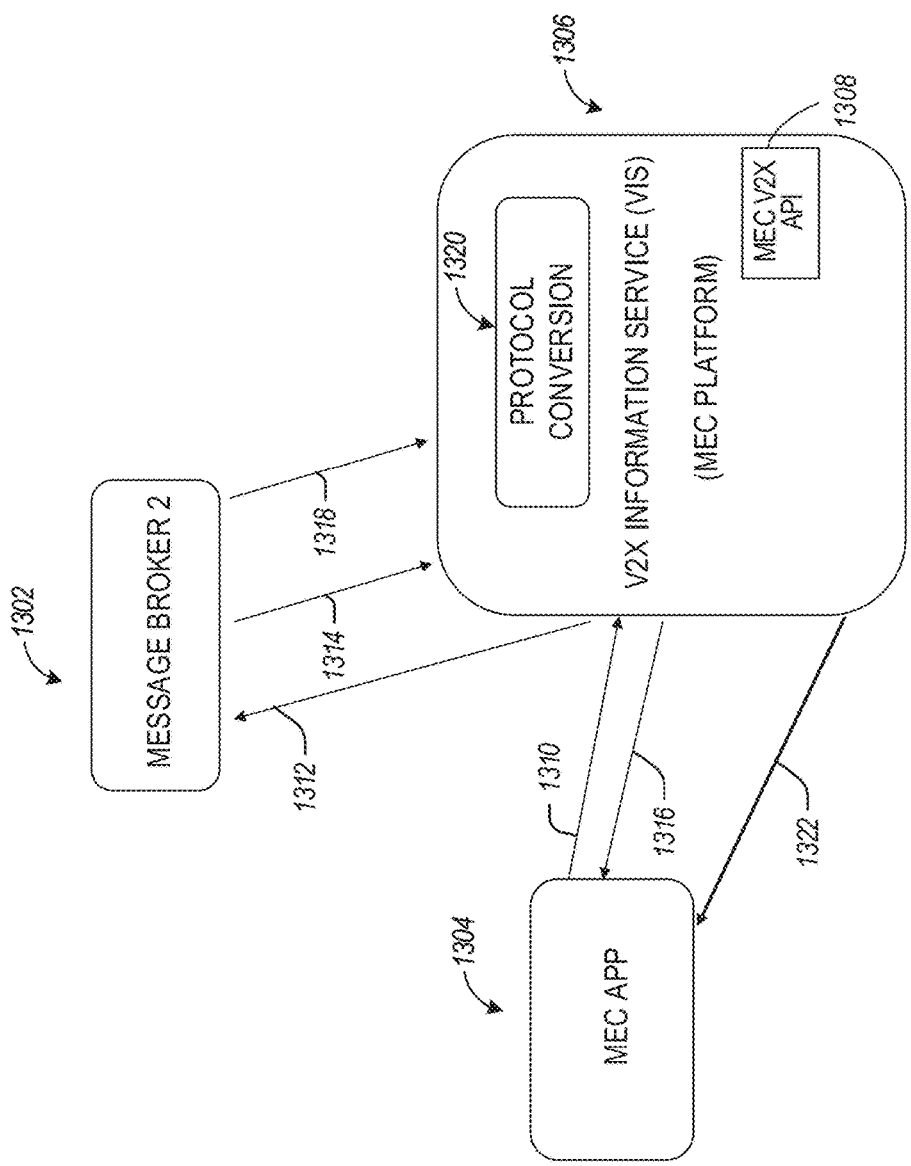
FIG. 13 illustrates an example signaling flow that may be performed when none of the available message brokers support the same application layer protocol (and its version) as the MEC app sending a request to subscribe to V2X messages, according to an example embodiment.

In the context of V2X communications supported by a MEC infrastructure, the disclosed techniques in connection with a V2X information service (VIS) and its accompanied MEC V2X API may be used to support multiple message brokers (e.g., as illustrated in FIGS. 11-13). More specifically, the VIS may be used to ensure V2X message interoperability across MNO deployments by supporting multiple message brokers of different capabilities and supporting different application-layer protocols (and versions thereof), while ensuring optimal data consumption and minimal signaling overhead.

FIG. 11 illustrates multiple message brokers and their signaling interactions (direct or indirect) with a MEC application (app) consuming V2X messages as well as with a MEC platform with a V2X information service (VIS), according to an example embodiment. Referring to FIG. 11, the MEC infrastructure 1100 includes a VIS 1108 (which may be part of a MEC platform) in communication with a MEC app 1106 and message brokers 1102, 1104.

As a result of using the disclosed techniques, at least two communication scenarios may occur, depending on the capabilities of the MEC application 1106 in need to consume V2X messages and the available message brokers.

(a) In some embodiments, a direct connection between a message broker (e.g., message broker 1102) and a MEC app (e.g., MEC app 1106) may be used for data consumption, when both the message broker and the MEC app support the same application layer protocol (e.g., as illustrated in greater detail in FIG. 12).

(b) In other embodiments (e.g., when direct V2X message notifications between the MEC app and the message broker are infeasible such as when each uses a different application layer protocol), a connection between the MEC app (e.g., MEC app 1106) and the message broker (e.g., message broker 1104) via the MEC platform (e.g., VIS 1108 in a MEC platform) may also be used (e.g., as illustrated in FIG. 13). In this case, for every incoming V2X message, the VIS 1108 acts as an intermediate entity between the service consumer (e.g., the MEC App) and the available message brokers. In some aspects, the V2X messages are first converted by the VIS from the protocols the message brokers support to the protocol supported by the subscribed MEC app and are then forwarded to the subscribed MEC app.

Enabling V2X message interoperability using the disclosed techniques across MNOs, car Original Equipment Manufacturers (OEMs), and MEC systems is of value for the safety of drivers, passengers, pedestrians, and all entities involved in an automotive/roadside environment. The disclosed techniques may also be used for improving the driving experience and convenience on the road.

FIG. 12 illustrates an example signaling flow that may be performed when at least one of the available message brokers supports the same application layer protocol (and its version) as the MEC app sending a request to subscribe to V2X messages, according to an example embodiment. Referring to FIG. 12, the MEC infrastructure 1200 includes a VIS 1206 (executing as part of a MEC platform of a MEC host), a MEC app 1204, and a message broker 1202. Additionally, one or more of the MEC app 1204, the message broker 1202, and the VIS 1206 may be part of the same MEC host, or each may be part of different MEC hosts. Furthermore, the message broker 1202 and the MEC app 1204 may be associated with the same MNO, or each may be associated with different MNOs.

In an example embodiment, the message broker 1202 may be configured as a registered service in a MEC platform (e.g., the same MEC platform including VIS 1206 or a different MEC platform in a different MEC host). In other words, the message broker may be part of a MEC platform's service registry. Communication with the MEC app requesting a subscription to a V2X messaging service occurs via the Mp1 interface (in aspects when the MEC app is instantiated at the same MEC host as the MEC platform) and also involves the Mp3 interface in aspects when the message broker service and the requestor MEC app are instantiated at different MEC hosts of the same MEC system. In case these different MEC hosts belong to different MEC systems of a MEC federation, then, instead of Mp3, MEC federation reference points are involved in this communication.

In an example embodiment, the message broker 1202 may be configured as a service-producing MEC app, either instantiated at the same MEC host as the MEC app requesting a subscription to V2X messages or at another MEC host of the same or of another MEC system. In the case of different locality (MEC host), the Mp1 and Mp3/MEC federation interfaces are involved in communication. In aspects when the same MEC host is involved, the Mp1 interface will be used primarily.

In the communication exchange in FIG. 12, the MEC app 1204 is configured (e.g., before subscribing to a V2X messaging service to receive or send V2X messages via a message broker) with an application layer protocol to be able to receive direct V2X message notifications from one (or more) of the available message brokers supporting the same protocol (and its version). As a result, direct V2X message notifications are feasible after the service consumer (e.g., MEC app 1204) is associated with the message broker supporting the same protocol (e.g., message broker 1202. In some aspects, the following operations may be performed as illustrated with corresponding reference numbers in FIG. 12.

At operation 1208, the VIS service/V2X message consumer (e.g., MEC app 1204) sends a subscription request to the VIS 1206 via the MEC V2X API 1207. The MEC V2X API 1207 may be a V2X information service API performing functionalities outlined in the ETSI GS MEC 030 specification (e.g., v2.1.1, April 2020). In some aspects, the request contains one or more filtering criteria such as application layer protocol(s) (and their versions) supported by the MEC app 1204.

At operation 1210, assuming several message brokers have registered to the MEC platform hosting the VIS 1206 as service-consuming MEC apps (e.g., offering a "V2X message" service), the VIS 1206 advertises the subscription request from the MEC app 1204 to all available message brokers (associated with the same or different MNOs) using the MEC V2X API 1207.

At operation 1212, the message broker (e.g., message broker 1202) that satisfies all filtering criteria indicated by the V2X message consumer (e.g., MEC app 1204) in its subscription request acknowledges the subscription request to the VIS 1206 via the MEC V2X API 1207.

At operation 1214, VIS 1206 announces the successful creation of the subscription to the VIS service/V2X message consumer (e.g., MEC app 1204) via the MEC V2X API 1207.

At operation 1216, V2X message notifications are directly provided by the message broker 1202 to the V2X message consumer (e.g., MEC app 1204).

FIG. 13 illustrates an example signaling flow that may be performed when none of the available message brokers support the same application layer protocol (and its version) as the MEC app sending a request to subscribe to V2X messages, according to an example embodiment. Referring to FIG. 13, the MEC infrastructure 1300 includes a VIS 1306 (executing as part of a MEC platform of a MEC host), a MEC app 1304, and a message broker 1302. Additionally, one or more of the MEC app 1304, the message broker 1302, and the VIS 1306 may be part of the same MEC host, or each may be part of different MEC hosts. Furthermore, the message broker 1302 and the MEC app 1304 may be associated with the same MNO, or each may be associated with different MNOs.

In an example embodiment, the message broker 1302 may be configured as a registered service in a MEC platform (e.g., the same MEC platform including VIS 1306 or a different MEC platform in a different MEC host). In other words, the message broker may be part of a MEC platform's service registry. Communication with the MEC app requesting a subscription to a V2X messaging service occurs via the Mp1 interface (in aspects when the MEC app is instantiated at the same MEC host as the MEC platform) and also involves the Mp3 interface in aspects when the message broker service and the requestor MEC app are instantiated at different MEC hosts of the same MEC system. In case these different MEC hosts belong to different MEC systems of a MEC federation, then, instead of Mp3, MEC federation reference points are involved in this communication.

In an example embodiment, the message broker 1302 may be configured as a service-producing MEC app, either instantiated at the same MEC host as the MEC app 1304 requesting a subscription to V2X messages or at another MEC host of the same or of another MEC system. In the case of different locality (MEC host), the Mp1 and Mp3/MEC federation interfaces are involved in communication. In aspects when the same MEC host is involved, the Mp1 interface will be used primarily.

In the communication exchange in FIG. 13, the MEC app 1304 has not previously embedded any of the protocols supported by the currently available message brokers, needed to receive direct V2X message notifications from these message brokers. Consequently, direct V2X message notifications between the message broker and the MEC app are infeasible. In this aspect, for every incoming V2X message, the VIS 1306 can act as an intermediate entity between the service consumer (e.g., MEC app 1304) and the available message brokers (e.g., message broker 1302). V2X messages are first converted by the VIS 1306 from the protocol(s) the message brokers support to the protocol supported by the subscribed MEC app and are then forwarded to the subscribed MEC app. In some aspects, the following operations may be performed as illustrated with corresponding reference numbers in FIG. 13.

At operation 1310, the VIS service/V2X message consumer (e.g., MEC app 1304) sends a subscription request to the VIS 1306 via the MEC V2X API 1308. The request may include filtering criteria such as one or more application layer protocol(s) (and their versions) supported by the MEC app 1304.

At operation 1312, the VIS 1306 advertises the received subscription request to all available message brokers (e.g., instantiated as service-producing MEC apps, also registered to the MEC platform associated with the VIS 1306) via the MEC V2X API 1308.

At operation 1314, no message broker acknowledges satisfaction of all filtering criteria of the subscription request within a pre-defined time interval. VIS 1306 resends the subscription request without the filtering criterion of the supported protocol. One or multiple message brokers (e.g., message broker 1302) acknowledge the subscription request to the VIS 1306 via the MEC V2X API 1308.

At operation 1316, VIS 1306 announces successful subscription to the VIS service/V2X message consumer (e.g., MEC app 1304) via the MEC V2X API 1308.

At operation 1318, V2X message notifications are sent to the VIS 1306 for the needed protocol conversion.

At operation 1320, protocol conversion takes place within the VIS 1306.

At operation 1322, message notification takes place. More specifically, the converted V2X message is sent over to the VIS service/V2X message consumer (e.g., MEC app 1304) via the MEC V2X API 1308 by using its comprehended protocol.

In some embodiments, the VIS (e.g., VIS 1108, VIS 1206, and VIS 1306) can be configured in a computing node implemented as a roadside unit (RSU). The MEC app (e.g., MEC app 1106, MEC app 1204, and MEC app 1304) can be configured as a user equipment (UE) application executing at a mobile computing node (e.g., V2X-enabled moving vehicle or another type of mobile computing device). Similarly, the disclosed message brokers can also be MEC apps executing on a MEC host that is configured as either a stationary node (e.g., RSU) or a mobile node (e.g., a moving vehicle or another type of moving computing device).

FIG. 14 illustrates a flow diagram of a method 1400 for performing a VIS configuration in a MEC network, according to an example embodiment. Method 1400 may include operations 1402, 1404, 1406, and 1408 performed by a computing node configured with VIS (e.g., VIS 1108 or VIS 1206).

At operation 1402, a subscription request to an information service is detected (e.g., as a result of operation 1208). The subscription request originates from a MEC application (e.g., MEC app 1204) instantiated on a MEC host of the MEC network. The subscription request includes at least one filtering criterion indicative of an information-processing configuration of the MEC application. For example, the filtering request includes application layer protocol(s) and protocol version(s) supported by MEC app 1204.

In some embodiments, the at least one filtering criterion in the subscription request can include description or configuration of the type of information of a message broker (or information service provider) supported by the MEC app (or the information service consumer) for consumption/use. In some embodiments, the at least one filtering criterion in the subscription request includes location information of the MEC app (e.g., a current or future location information of a stationary or mobile computing node configured as a MEC host executing the MEC app sending the subscription request). In some embodiments, the at least one filtering criterion in the subscription request includes an indication of one or more communication protocols that can be used by the MEC app, a message type (e.g., a message associated with a specific telecommunications standard) that can be consumed by the MEC app and compatible protocols that can be used to consume/read/access the message including protocol version of the information service message (e.g., V2X message) that the MEC app can receive/consume/access or otherwise process.

In some aspects, communications (e.g., information service messages or other types of messages) sent by the message brokers to the VIS for publication/communication to message consumers (e.g., MEC apps) can include information indicative of message properties of the information contained in the message (e.g., representation format, compatible protocols that can be used to consume/read/access the message including protocol version, application layer protocol used to generate the message, applicable communication standard, geo-location information of a computing node implementing the message broker, etc.) as well as message content/data.

At operation 1404, the subscription request with the at least one filtering criterion is forwarded to a plurality of providers of the information service within the MEC network (e.g., forwarding or advertising of the subscription request to message broker 1202 at operation 1210).

At operation 1406, a response message received (e.g., at operation 1212) from at least one provider (e.g., message broker 1202) of the plurality of providers is decoded. The response message indicates an acceptance of the subscription request by the at least one provider.

At operation 1408, an acknowledgment message is encoded for transmission to the MEC application via the network interface circuitry (e.g., at operation 1214). The acknowledgment message indicates the acceptance of the subscription request by the at least one provider.

Impacted Data Types

In both communication scenarios illustrated in FIG. 12 and FIG. 13, the first operation (between the MEC app and the VIS in the MEC platform) is to subscribe to V2X messages of (i) a specific standards organization (e.g., ETSI ITS messages) and (ii) a specific message type (e.g., cooperative awareness message or CAM, Decentralized Environmental Notification Message or DENM, etc.). Such V2X messages may be provided by message brokers using an application layer protocol comprehensible by the MEC app. In case of non-availability of the above-preferred message brokers per the filtering criteria of the subscription request, or, to exploit the full V2X message footprint across an inter-operator area involving message brokers of different capability and supported protocols, the VIS may be used to convert V2X messages following an application layer protocol not supported by the VIS consumer (e.g., the MEC app) to messages following an application layer protocol supported by the VIS (V2X message) consumer.

In some embodiments, in terms of filtering criteria involved in the subscription request, the V2xMsgSubscription data type (illustrated in TABLE 1 below and specified in ETSI GS MEC 030, v2.1.1), may be enhanced with further attributes (e.g., infoProtocol, msgProtocol, and protImplementation), as indicated by the bolded text in TABLE 1 below.

TABLE 1

(V2XMsgSubscription Data Type)

| Attribute name | Data type | Cardinality | Description |
| --- | --- | --- | --- |
| subscriptionType | String | 1 | Shall be set to "V2xMsgSubscription". |
| callbackReference | URI | 1 | URI selected by the service consumer to receive notifications on the subscribed V2X message. This shall be included both in the request and in response. |
| _links | Structure (inlined) | 0 . . . 1 | Hyperlink related to the resource. This shall be only included in the HTTP responses and in HTTP PUT requests. |
| >self | LinkType | 1 | Self-referring URI. The URI shall be unique within the VIS API as it acts as an ID for the subscription. |
| filterCriteria | Structure (inlined) | 1 | List of filtering criteria for the subscription. Any filtering criteria from below, which is included in the request, shall also be included in the response. |
| >stdOrganization | Enum | 1 | Standardization organization which defines the subscribed V2X message type:<br>ETSI: European Telecommunications Standards Institute.<br>See note 1. |
| >msgType | Enum | 0 . . . N | Subscribed V2X message type. Its value is defined by the standardization organization indicated by the attribute stdOrganization. See note 2. |
| >infoProtocol | Structure (inlined) | 1 | Specifics of the application layer protocol supported by the service consumer. |
| >>msgProtocol | Enum | 1 . . . N | Numerical value corresponding to the application layer protocol supported by the service consumer. For the msgProtocol, the following values are currently defined (see note 3):<br>0 = MQTT v3.1.0<br>1 = MQTT v3.1.1<br>2 = MQTT v5<br>3 = MQTT-SN<br>4 = AMQP 1.0 |
| >>protImplementation | String | 1 | Implementation specifics of application layer protocol, e.g., programming language. |
| expiryDeadline | TimeStamp | 0 . . . 1 | Time stamp. |

NOTE 1:
Other standardization organizations could be added as needed.
NOTE 2:
The V2X message types of ETSI shall be used as specified in ETSI TS 102 894-2 [6], clause A.114.
NOTES:
Other application transport protocols (and versions thereof) could be added as needed.

More specifically, the filtering criteria specified in the V2X subscription request (e.g., the V2XMsgSubscription in TABLE 1) includes the application layer protocol supported by the service consumer (e.g., the MEC app) as indicated by the msgProtocol field. Example values of the field are indicated in TABLE 1 and can vary from 0-4 in some aspects, corresponding to a different version of the message queuing telemetry transport (MQTT) protocol and the advanced message queuing protocol (AMQP). Other field values corresponding to different protocols may also be used.

Further, when a V2X message is published via the V2XMsgPublication data type (e.g., by a MEC app to a message broker or the VIS in the MEC platform), apart from the V2X message type and encoding format, the used application layer protocol needs to be indicated, as well, for the VIS to either divert the V2X message to the available (and reachable) message broker that supports the same application layer protocol (and its same version) or for the VIS to carry out protocol conversion before diverting the published V2X message to a message broker that does not support the application layer protocol indicated by the published V2X message. As a result, the V2xMsgPublication data type (e.g., illustrated in TABLE 2 below and specified in ETSI GS MEC 030, v2.1.1), may be enhanced with further attributes, (e.g., msgProtocol and protImplementation), as indicated by the bolded text in TABLE 2 below MEC app) and used for the message publication, as indicated by the msgProtocol field. Example values of the field are indicated in TABLE 1 and can vary from 0-4 in some aspects, corresponding to a different version of the message queuing telemetry transport (MQTT) protocol and the advanced message queuing protocol (AMQP). Other field values corresponding to different protocols may also be used.

Subscription of V2X Message Consumers to Message Brokers

In some aspects, as a prerequisite, a message broker may be assumed to be a service-producing MEC app. This service may be registered to the MEC platform, as a producer of V2X messages. For both communication scenarios of FIG. 12 (e.g., operation 1208) and FIG. 13 (e.g., operation 1310), once the MEC app (e.g., a VIS consumer) considers subscription to V2X messages, the task of the VIS will be to advertise this (along with other) incoming subscription requests to the available message brokers. Such an advertisement, possibly enhanced by location information of the vehicles, will be then used by VIS (based on message brokers' feedback/acknowledgment) to associate the calling VIS consumer MEC app to the best (in terms of, e.g., supported application layer protocol, latency, load balancing, etc.) message broker. In some aspects, this procedure applies to the ETSI GS MEC 030 (v2.1.1) specification or as a generic procedure in GS MEC 011 (v2.2.1). In some aspects, the above prerequisite may follow any existing

TABLE 2

(V2XMsgPublication Data Type)

| Attribute name | Data type | Cardinality | Description |
| --- | --- | --- | --- |
| stdOrganization | Enum | 1 | Standardization organization which defines the published V2X message type: ETSI: European Telecommunications Standards Institute. See note 1. |
| msgType | Enum | 1 | Published V2X message type. Its value is defined by the standardization organization indicated by the attribute stdOrganization. See note 2. |
| msgEncodeFormat | String | 1 | The encode format of the V2X message, for example base64. |
| msgContent | String | 1 | Published V2X message content. Its format is defined by the standardization organization indicated by the attribute stdOrganization. |
| msgProtocol | Enum | 1 | Numerical value corresponding to the application layer protocol supported by the service consumer. For the msgProtocol, the following values are currently defined (see note 3): 0 = MQTT v3.1.0 1 = MQTT v3.1.1 2 = MQTT v5 3 = MQTT-SN 4 = AMQP 1.0 |
| protImplementation | String | 1 | Implementation specifcs of application layer protocol, e.g., programming language. |

NOTE 1:
Other standardization organizations could be added as needed.
NOTE 2:
The V2X message types of ETSI shall be used as specified in ETSI TS 102 894-2 [6], clause A. 114.
NOTE 3:
Other application transport protocols (and versions thereof) could be added as needed.

Similar to TABLE 1, the filtering criteria specified in the V2X message publication request (e.g., the V2XMsgPublication in TABLE 2) includes the application layer protocol supported by the service consumer (e.g., the procedures for "MEC service-producing MEC applications", as specified in GS MEC 011.

It will be understood that the present techniques associated with MEC V2X API interoperability support for multiple V2X message brokers may be integrated with many aspects of edge computing strategies and deployments including edge networks illustrated and discussed in connection with FIGS. 1-8C. Edge computing, at a general level, refers to the transition of compute and storage resources closer to endpoint devices (e.g., consumer computing devices, user equipment, etc.) to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

In the context of satellite communication networks, edge computing operations may occur, as discussed above, by moving workloads onto computing equipment at satellite vehicles; using satellite connections to offer backup or (redundant) links and connections to lower-latency services; coordinating workload processing operations at terrestrial access points or base stations; providing data and content via satellite networks; and the like. Thus, many of the same edge computing scenarios that are described below for mobile networks and mobile client devices are equally applicable when using a non-terrestrial network.

It should be understood that the functional units or capabilities described in this specification may have been referred to or labeled as components, circuits, or modules, to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field-programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example 1 is a computing node to implement a vehicle-to-everything (V2X) information service (VIS) in a Multi-Access Edge Computing (MEC) network, the computing node comprising: network interface circuitry; and processing circuitry coupled to the network interface circuitry, the processing circuitry configured to: detect a subscription request to an information service, the subscription request originating from a MEC application instantiated on a MEC host of the MEC network, and the subscription request including at least one filtering criterion indicative of an information-processing configuration of the MEC application; forward via the network interface circuitry, the subscription request with the at least one filtering criterion to a plurality of computing resources, the plurality of computing resources configured as a corresponding plurality of providers of the information service within the MEC network; decode a response message received from at least one provider of the plurality of providers, the response message indicating an acceptance of the subscription request by the at least one provider; and encode an acknowledgment message for transmission to the MEC application via the network interface circuitry, the acknowledgment message indicating the acceptance of the subscription request by the at least one provider.

In Example 2, the subject matter of Example 1 includes subject matter where the processing circuitry is further configured to decode a registration request from each provider of the plurality of providers, the registration request indicating that the provider offers a V2X message service within the MEC network.

In Example 3, the subject matter of Example 2 includes subject matter where the MEC host is a mobile device, and wherein the plurality of providers are instantiated as a corresponding plurality of MEC applications on at least a second MEC host of the MEC network.

In Example 4, the subject matter of Example 3 includes subject matter where the processing circuitry is further configured to register the plurality of MEC applications as service-producing MEC applications configuring the V2X message service within the MEC network.

In Example 5, the subject matter of Examples 1-4 includes subject matter where one or more of the plurality of providers is configured as a service-producing application instantiated on the MEC host.

In Example 6, the subject matter of Examples 1-5 includes subject matter where the subscription request is received from a MEC V2X application programming interface (API) of the VIS, the MEC V2X API configured at the MEC host.

In Example 7, the subject matter of Examples 1-6 includes subject matter where the response message further indicates compatibility of an information-processing configuration of the at least one provider with the information-processing configuration of the MEC application.

In Example 8, the subject matter of Example 7 includes subject matter where the information-processing configuration of the at least one provider and the information-processing configuration of the MEC application include use of a common application layer protocol.

In Example 9, the subject matter of Examples 1-8 includes subject matter where the acknowledgment message further indicates that the at least one provider is eligible for the MEC application to initiate a communication session to the information service via direct communication with the at least one provider.

In Example 10, the subject matter of Examples 1-9 includes subject matter where the processing circuitry is further configured to detect a second subscription request to a second information service, the second subscription request originating from the MEC application, the second subscription request including at least a second filtering criterion indicative of an application layer protocol supported by the MEC application.

In Example 11, the subject matter of Example 10 includes subject matter where the processing circuitry is further configured to forward via the network interface circuitry, the second subscription request with the at least second filtering criterion to the plurality of providers, and the plurality of providers instantiated as a corresponding plurality of MEC applications providing the second information service.

In Example 12, the subject matter of Example 11 includes subject matter where the processing circuitry is further configured to encode an acknowledgment message for transmission to the MEC application via the network interface circuitry, the acknowledgment message indicating acceptance of the second subscription request by the computing node.

In Example 13, the subject matter of Example 12 includes subject matter where the processing circuitry is further configured to decode an information message from at least a second provider of the plurality of providers, the information message associated with the second subscription request and configured based on an application layer protocol supported by the at least second provider, wherein the application layer protocol supported by the at least second provider is incompatible with the application layer protocol supported by the MEC application; perform protocol conversion of the information message to the application layer protocol supported by the MEC application to generate a converted information message; and encode the converted information message for transmission to the MEC application in response to the second subscription request.

Example 14 is at least one non-transitory machine-readable storage medium comprising instructions stored thereupon, which when executed by processing circuitry of a computing node operable to implement a vehicle-to-everything (V2X) information service (VIS) in a Multi-Access Edge Computing (MEC) network, cause the processing circuitry to perform operations comprising: detecting a subscription request to an information service, the subscription request originating from a MEC application instantiated on a MEC host of the MEC network, and the subscription request including at least one filtering criterion indicative of an information-processing configuration of the MEC application; forwarding the subscription request with the at least one filtering criterion to a plurality of computing resources, the plurality of computing resources configured as a corresponding plurality of providers of the information service within the MEC network decoding a response message received from at least one provider of the plurality of providers, the response message indicating an acceptance of the subscription request by the at least one provider; and encoding an acknowledgment message for transmission to the MEC application, the acknowledgment message indicating the acceptance of the subscription request by the at least one provider.

In Example 15, the subject matter of Example 14 includes, the operations including: decoding a registration request from each provider of the plurality of providers, the registration request indicating that the provider offers a V2X message service within the MEC network.

In Example 16, the subject matter of Example 15 includes subject matter where the plurality of providers are instantiated as a corresponding plurality of MEC applications on at least a second MEC host of the MEC network.

In Example 17, the subject matter of Example 16 includes, the operations including: registering the plurality of MEC applications as service-producing MEC applications configuring the V2X message service within the MEC network.

In Example 18, the subject matter of Examples 14-17 includes, the operations including: detecting a second subscription request to a second information service, the second subscription request originating from the MEC application, the second subscription request including at least a second filtering criterion indicative of an application layer protocol supported by the MEC application; and forwarding the second subscription request with the at least second filtering criterion to the plurality of providers, and the plurality of providers instantiated as a corresponding plurality of MEC applications providing the second information service.

In Example 19, the subject matter of Example 18 includes, the operations including: encoding an acknowledgment message for transmission to the MEC application, the acknowledgment message indicating acceptance of the second subscription request by the computing node; decoding an information message from at least a second provider of the plurality of providers, the information message associated with the second subscription request and configured based on an application layer protocol supported by the at least second provider, wherein the application layer protocol supported by the at least second provider is incompatible with the application layer protocol supported by the MEC application; performing protocol conversion of the information message to the application layer protocol supported by the MEC application to generate a converted information message; and encoding the converted information message for transmission to the MEC application in response to the second subscription request.

Example 20 is a method for performing a vehicle-to-everything (V2X) information service (VIS) configuration in a Multi-Access Edge Computing (MEC) network, the method comprising: detecting by processing circuitry of a computing node, a subscription request to an information service, the subscription request originating from a MEC application instantiated on a MEC host of the MEC network, and the subscription request including at least one filtering criterion indicative of an information-processing configuration of the MEC application; forwarding the subscription request with the at least one filtering criterion to a plurality of computing resources, the plurality of computing resources configured as a corresponding plurality of providers of the information service within the MEC network decoding a response message received from at least one provider of the plurality of providers, the response message indicating an acceptance of the subscription request by the at least one provider; and encoding an acknowledgment message for transmission to the MEC application, the acknowledgment message indicating the acceptance of the subscription request by the at least one provider.

In Example 21, the subject matter of Example 20 includes, decoding a registration request from each provider of the plurality of providers, the registration request indicating that the provider offers a V2X message service within the MEC network.

In Example 22, the subject matter of Examples 20-21 includes, detecting a second subscription request to a second information service, the second subscription request originating from the MEC application, the second subscription request including at least a second filtering criterion indicative of an application layer protocol supported by the MEC application; and forwarding the second subscription request with the at least second filtering criterion to the plurality of providers, and the plurality of providers instantiated as a corresponding plurality of MEC applications providing the second information service.

In Example 23, the subject matter of Example 22 includes, encoding an acknowledgment message for transmission to the MEC application, the acknowledgment message indicating acceptance of the second subscription request by the computing node; decoding an information message from at least a second provider of the plurality of providers, the information message associated with the second subscription request and configured based on an application layer protocol supported by the at least second provider, wherein the application layer protocol supported by the at least second provider is incompatible with the application layer protocol supported by the MEC application; performing protocol conversion of the information message to the application layer protocol supported by the MEC application to generate a converted information message; and encoding the converted information message for transmission to the MEC application in response to the second subscription request.

Example 24 is an apparatus comprising: means for detecting a subscription request to an information service, the subscription request originating from a MEC application instantiated on a MEC host of the MEC network, and the subscription request including at least one filtering criterion indicative of an information-processing configuration of the MEC application; means for forwarding the subscription request with the at least one filtering criterion to a plurality of providers of the information service within the MEC network; means for decoding a response message received from at least one provider of the plurality of providers, the response message indicating an acceptance of the subscription request by the at least one provider; and means for encoding an acknowledgment message for transmission to the MEC application, the acknowledgment message indicating the acceptance of the subscription request by the at least one provider.

In Example 25, the subject matter of Example 24 includes, means for detecting a second subscription request to a second information service, the second subscription request originating from the MEC application, the second subscription request including at least a second filtering criterion indicative of an application layer protocol supported by the MEC application; means for forwarding the second subscription request with the at least second filtering criterion to the plurality of providers, and the plurality of providers instantiated as a corresponding plurality of MEC applications providing the second information service; means for encoding an acknowledgment message for transmission to the MEC application, the acknowledgment message indicating acceptance of the second subscription request by the apparatus; means for decoding an information message from at least a second provider of the plurality of providers, the information message associated with the second subscription request and configured based on an application layer protocol supported by the at least second provider, wherein the application layer protocol supported by the at least second provider is incompatible with the application layer protocol supported by the MEC application; means for performing protocol conversion of the information message to the application layer protocol supported by the MEC application to generate a converted information message; and means for encoding the converted information message for transmission to the MEC application in response to the second subscription request.

Example 26 is an edge computing node, operable in an edge computing system, comprising processing circuitry configured to implement any of the Examples 1-25.

Example 27 is an edge computing node, operable as a server in an edge computing system, configured to perform any of the Examples 1-25.

Example 28 is an edge computing node, operable as a client in an edge computing system, configured to perform any of the Examples 1-25.

Example 29 is an edge computing node, operable in a layer of an edge computing network as an aggregation node, network hub node, gateway node, or core data processing node, configured to perform any of the Examples 1-25.

Example 30 is an edge computing network, comprising networking and processing components configured to provide or operate a communications network, to enable an edge computing system to implement any of the Examples 1-25.

Example 31 is an access point, comprising networking and processing components configured to provide or operate a communications network, to enable an edge computing system to implement any of the Examples 1-25.

Example 32 is a base station, comprising networking and processing components configured to provide or operate a communications network, to enable an edge computing system to implement any of the Examples 1-25.

Example 33 is a roadside unit (RSU), comprising networking components configured to provide or operate a communications network, to enable an edge computing system to implement any of the Examples 1-25.

Example 34 is an on-premise server, operable in a private communications network distinct from a public edge computing network, the server configured to enable an edge computing system to implement any of the Examples 1-25.

Example 35 is a 3GPP 4G/LTE mobile wireless communications system, comprising networking and processing components configured with the biometric security methods of any of the Examples 1-25.

Example 36 is a 5G network mobile wireless communications system, comprising networking and processing components configured with the biometric security methods of any of the Examples 1-25.

Example 37 is a user equipment device, comprising networking and processing circuitry, configured to connect with an edge computing system configured to implement any of the Examples 1-25.

Example 38 is a client computing device, comprising processing circuitry, configured to coordinate compute operations with an edge computing system, the edge computing system is configured to implement any of the Examples 1-25.

Example 39 is an edge provisioning node, operable in an edge computing system, configured to implement any of the Examples 1-25.

Example 40 is a service orchestration node, operable in an edge computing system, configured to implement any of the Examples 1-25.

Example 41 is an application orchestration node, operable in an edge computing system, configured to implement any of the Examples 1-25.

Example 42 is a multi-tenant management node, operable in an edge computing system, configured to implement any of the Examples 1-25.

Example 43 is an edge computing system comprising processing circuitry, the edge computing system configured to operate one or more functions and services to implement any of the Examples 1-25.

Example 44 is an edge computing system, comprising a plurality of edge computing nodes, the plurality of edge computing nodes configured with the biometric security methods of any of the Examples 1-25.

Example 45 is networking hardware with network functions implemented thereupon, operable within an edge computing system configured with the biometric security methods of any of Examples 1-25.

Example 46 is acceleration hardware with acceleration functions implemented thereupon, operable in an edge computing system, the acceleration functions configured to implement any of the Examples 1-25.

Example 47 is storage hardware with storage capabilities implemented thereupon, operable in an edge computing system, the storage hardware configured to implement any of the Examples 1-25.

Example 48 is computation hardware with compute capabilities implemented thereupon, operable in an edge computing system, the computation hardware configured to implement any of the Examples 1-25.

Example 49 is an edge computing system adapted for supporting vehicle-to-vehicle (V2V), vehicle-to-everything (V2X), or vehicle-to-infrastructure (V2I) scenarios, configured to implement any of the Examples 1-25.

Example 50 is an edge computing system adapted for operating according to one or more European Telecommunications Standards Institute (ETSI) Multi-Access Edge Computing (MEC) specifications, the edge computing system configured to implement any of the Examples 1-25.

Example 51 is an edge computing system adapted for operating one or more multi-access edge computing (MEC) components, the MEC components provided from one or more of: a MEC proxy, a MEC application orchestrator, a MEC application, a MEC platform, or a MEC service, according to a European Telecommunications Standards Institute (ETSI) Multi-Access Edge Computing (MEC) configuration, the MEC components configured to implement any of the Examples 1-25.

Example 52 is an edge computing system configured as an edge mesh, provided with a microservice cluster, a microservice cluster with sidecars, or linked microservice clusters with sidecars, configured to implement any of the Examples 1-25.

Example 53 is an edge computing system, comprising circuitry configured to implement one or more isolation environments provided among dedicated hardware, virtual machines, containers, virtual machines on containers, configured to implement any of the Examples 1-25.

Example 54 is an edge computing server, configured for operation as an enterprise server, roadside server, street cabinet server, or telecommunications server, configured to implement any of the Examples 1-25.

Example 55 is an edge computing system configured to implement any of the Examples 1-25 with use cases provided from one or more of: compute offload, data caching, video processing, network function virtualization, radio access network management, augmented reality, virtual reality, autonomous driving, vehicle assistance, vehicle communications, industrial automation, retail services, manufacturing operations, smart buildings, energy management, internet of things operations, object detection, speech recognition, healthcare applications, gaming applications, or accelerated content processing.

Example 56 is an edge computing system, comprising computing nodes operated by multiple owners at different geographic locations, configured to implement any of the Examples 1-25.

Example 57 is a cloud computing system, comprising data servers operating respective cloud services, the respective cloud services configured to coordinate with an edge computing system to implement any of the Examples 1-25.

Example 58 is a server, comprising hardware to operate cloudlet, edgelet, or applet services, the services configured to coordinate with an edge computing system to implement any of the Examples 1-25.

Example 59 is an edge node in an edge computing system, comprising one or more devices with at least one processor and memory to implement any of the Examples 1-25.

Example 60 is an edge node in an edge computing system, the edge node operating one or more services provided from among a management console service, a telemetry service, a provisioning service, an application or service orchestration service, a virtual machine service, a container service, a function deployment service, or a compute deployment service, or an acceleration management service, the one or more services configured to implement any of the Examples 1-25.

Example 61 is a set of distributed edge nodes, distributed among a network layer of an edge computing system, the network layer comprising a close edge, local edge, enterprise edge, on-premise edge, near edge, middle, edge, or far edge network layer, configured to implement any of the Examples 1-25.

Example 62 is an apparatus of an edge computing system comprising: one or more processors and one or more computer-readable media comprising instructions that, when executed by the one or more processors, cause the one or more processors to perform any of the Examples 1-25.

Example 63 is one or more computer-readable storage media comprising instructions to cause an electronic device of an edge computing system, upon execution of the instructions by one or more processors of the electronic device, to perform any of the Examples 1-25.

Example 64 is a communication signal communicated in an edge computing system, to perform any of the Examples 1-25.

Example 65 is a data structure communicated in an edge computing system, the data structure comprising a datagram, packet, frame, segment, protocol data unit (PDU), or message, to perform any of the Examples 1-25.

Example 66 is a signal communicated in an edge computing system, the signal encoded with a datagram, packet, frame, segment, protocol data unit (PDU), message, or data to perform any of the Examples 1-25.

Example 67 is an electromagnetic signal communicated in an edge computing system, the electromagnetic signal carrying computer-readable instructions, wherein execution of the computer-readable instructions by one or more processors causes the one or more processors to perform any of the Examples 1-25.

Example 68 is a computer program used in an edge computing system, the computer program comprising instructions, wherein execution of the program by a processing element in the edge computing system is to cause the processing element to perform any of the Examples 1-25.

Example 69 is an apparatus of an edge computing system comprising means to perform any of the Examples 1-25.

Example 70 is an apparatus of an edge computing system comprising logic, modules, or circuitry to perform any of the Examples 1-25.

Example 71 is at least one machine-readable medium including instructions that, when executed by processing circuitry, cause the processing circuitry to perform operations to implement any of Examples 1-70.

Example 72 is an apparatus comprising means to implement any of Examples 1-70.

Example 73 is a system to implement any of Examples 1-70.

Example 74 is a method to implement any of Examples 1-70.

Although these implementations have been described with reference to specific exemplary aspects, it will be evident that various modifications and changes may be made to these aspects without departing from the broader scope of the present disclosure. Many of the arrangements and processes described herein can be used in combination or parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is disclosed. Thus, although specific aspects have been illustrated and described herein, it should be appreciated that any arrangement calculated to achieve the same purpose may be substituted for the specific aspects shown. This disclosure is intended to cover any adaptations or variations of various aspects. Combinations of the above aspects and other aspects not specifically described herein will be apparent to those of skill in the art upon reviewing the above description.

What is claimed is:

1. A computing node to implement a vehicle-to-everything (V2X) information service (VIS) in a Multi-Access Edge Computing (MEC) network, the computing node comprising:
   network interface circuitry; and
   processing circuitry coupled to the network interface circuitry, the processing circuitry configured to:
   detect a subscription request to an information service, the subscription request originating from a MEC application instantiated on a MEC host that is external to the VIS of the MEC network, and the subscription request including at least one filtering criterion indicative of an information-processing configuration of the MEC application, the information-processing configuration further indicating at least one or more communication protocols compatible with the MEC application;
   forward via the network interface circuitry, the subscription request with the at least one filtering criterion to a plurality of computing resources, the plurality of computing resources configured as a corresponding plurality of providers of the information service within the MEC network;
   decode a response message received from at least one provider of the plurality of providers, the response message indicating an acceptance of the subscription request by the at least one provider; and
   encode an acknowledgment message for transmission to the MEC application via the network interface circuitry, the acknowledgment message indicating the acceptance of the subscription request by the at least one provider and activation of a subscription of the MEC application to the information service provided by the at least one provider.

2. The computing node of claim 1, wherein the processing circuitry is further configured to:
   decode a registration request from each provider of the plurality of providers, the registration request indicating that the provider offers a V2X message service within the MEC network.

3. The computing node of claim 2, wherein the MEC host is a mobile device, and wherein the plurality of providers are instantiated as a corresponding plurality of MEC applications on at least a second MEC host of the MEC network.

4. The computing node of claim 3, wherein the processing circuitry is further configured to:
   register the plurality of MIEC applications as service-producing MEC applications configuring the V2X message service within the MEC network.

5. The computing node of claim 1, wherein one or more of the plurality of providers are configured as service-producing applications instantiated on the MEC host.

6. The computing node of claim 1, wherein the subscription request is received from a MEC V2X application programming interface (API) of the VIS, the MEC V2X API configured at the MEC host.

7. The computing node of claim 1, wherein the response message further indicates compatibility of an information-processing configuration of the at least one provider with the information-processing configuration of the MEC application.

8. The computing node of claim 7, wherein the information-processing configuration of the at least one provider and the information-processing configuration of the MEC application includes use of a common application layer protocol.

9. The computing node of claim 1, wherein the acknowledgment message further indicates that the at least one provider is eligible for the MEC application to initiate a communication session to the information service via direct communication with the at least one provider.

10. The computing node of claim 1, wherein the processing circuitry is further configured to:
    detect a second subscription request to a second information service, the second subscription request originating from the MEC application, the second subscription request including at least a second filtering criterion indicative of an application layer protocol supported by the MEC application.

11. The computing node of claim 10, wherein the processing circuitry is further configured to:
forward via the network interface circuitry, the second subscription request with the at least second filtering criterion to the plurality of providers, and the plurality of providers instantiated as a corresponding plurality of MEC applications providing the second information service.

12. The computing node of claim 11, wherein the processing circuitry is further configured to:
encode an acknowledgment message for transmission to the MEC application via the network interface circuitry, the acknowledgment message indicating acceptance of the second subscription request by the computing node.

13. The computing node of claim 12, wherein the processing circuitry is further configured to:
decode an information message from at least a second provider of the plurality of providers, the information message associated with the second subscription request and configured based on an application layer protocol supported by the at least second provider, wherein the application layer protocol supported by the at least second provider is incompatible with the application layer protocol supported by the MEC application;
perform protocol conversion of the information message to the application layer protocol supported by the MEC application to generate a converted information message; and
encode the converted information message for transmission to the MEC application in response to the second subscription request.

14. At least one non-transitory machine-readable storage medium comprising instructions stored thereupon, which when executed by processing circuitry of a computing node operable to implement a vehicle-to-everything (V2X) information service (VIS) in a Multi-Access Edge Computing (MEC) network, cause the processing circuitry to perform operations comprising:
detecting a subscription request to an information service, the subscription request originating from a MEC application instantiated on a MEC host that is external to the VIS of the MEC network, and the subscription request including at least one filtering criterion indicative of an information-processing configuration of the MEC application, the information-processing configuration further indicating at least one or more communication protocols compatible with the MEC application;
forwarding the subscription request with the at least one filtering criterion to a plurality of computing resources, the plurality of computing resources configured as a corresponding plurality of providers of the information service within the MEC network
decoding a response message received from at least one provider of the plurality of providers, the response message indicating an acceptance of the subscription request by the at least one provider; and
encoding an acknowledgment message for transmission to the MEC application, the acknowledgment message indicating the acceptance of the subscription request by the at least one provider and activation of a subscription of the MEC application to the information service provided by the at least one provider.

15. The at least one non-transitory machine-readable storage medium of claim 14, the operations including:
decoding a registration request from each provider of the plurality of providers, the registration request indicating that the provider offers a V2X message service within the MEC network.

16. The at least one non-transitory machine-readable storage medium of claim 15, wherein the plurality of providers are instantiated as a corresponding plurality of MEC applications on at least a second MEC host of the MEC network.

17. The at least one non-transitory machine-readable storage medium of claim 16, the operations including:
registering the plurality of MEC applications as service-producing MEC applications configuring the V2X message service within the MEC network.

18. The at least one non-transitory machine-readable storage medium of claim 14, the operations including:
detecting a second subscription request to a second information service, the second subscription request originating from the MEC application, the second subscription request including at least a second filtering criterion indicative of an application layer protocol supported by the MEC application; and
forwarding the second subscription request with the at least second filtering criterion to the plurality of providers, and the plurality of providers instantiated as a corresponding plurality of MEC applications providing the second information service.

19. The at least one non-transitory machine-readable storage medium of claim 18, the operations including:
encoding an acknowledgment message for transmission to the MEC application, the acknowledgment message indicating acceptance of the second subscription request by the computing node;
decoding an information message from at least a second provider of the plurality of providers, the information message associated with the second subscription request and configured based on an application layer protocol supported by the at least second provider, wherein the application layer protocol supported by the at least second provider is incompatible with the application layer protocol supported by the MEC application;
performing protocol conversion of the information message to the application layer protocol supported by the MEC application to generate a converted information message; and
encoding the converted information message for transmission to the MEC application in response to the second subscription request.

20. A method for performing a vehicle-to-everything (V2X) information service (VIS) configuration in a Multi-Access Edge Computing (MEC) network, the method comprising:
detecting by processing circuitry of a computing node, a subscription request to an information service, the subscription request originating from a MEC application instantiated on a MEC host that is external to the VIS of the MEC network, and the subscription request including at least one filtering criterion indicative of an information-processing configuration of the MEC application, the information-processing configuration further indicating at least one or more communication protocols compatible with the MEC application;
forwarding the subscription request with the at least one filtering criterion to a plurality of computing resources, the plurality of computing resources configured as a corresponding plurality of providers of the information service within the MEC network decoding a response message received from at least one provider of the plurality of providers, the response message indicating an acceptance of the subscription request by the at least one provider; and encoding an acknowledgment message for transmission to the MEC application, the acknowledgment message indicating the acceptance of the subscription request by the at least one provider and activation of a subscription of the MEC application to the information service provided by the at least one provider.

21. The method of claim 20, including comprising:

decoding a registration request from each provider of the plurality of providers, the registration request indicating that the provider offers a V2X message service within the MEC network.

22. The method of claim 20, comprising:

detecting a second subscription request to a second information service, the second subscription request originating from the MEC application, the second subscription request including at least a second filtering criterion indicative of an application layer protocol supported by the MEC application; and forwarding the second subscription request with the at least second filtering criterion to the plurality of providers, and the plurality of providers instantiated as a corresponding plurality of MEC applications providing the second information service.

23. The method of claim 22, comprising:

encoding an acknowledgment message for transmission to the MEC application, the acknowledgment message indicating acceptance of the second subscription request by the computing node;

decoding an information message from at least a second provider of the plurality of providers, the information message associated with the second subscription request and configured based on an application layer protocol supported by the at least second provider, wherein the application layer protocol supported by the at least second provider is incompatible with the application layer protocol supported by the MEC application;

performing protocol conversion of the information message to the application layer protocol supported by the MEC application to generate a converted information message; and encoding the converted information message for transmission to the MEC application in response to the second subscription request.

24. An apparatus of a vehicle-to-everything (V2X) information service (VIS) in a Multi-Access Edge Computing (MEC) network, the apparatus comprising:

means for detecting a subscription request to an information service, the subscription request originating from a MEC application instantiated on a MEC host that is external to the VIS of the MEC network, and the subscription request including at least one filtering criterion indicative of an information-processing configuration of the MEC application, the information-processing configuration further indicating at least one or more communication protocols compatible with the MEC application;

means for forwarding the subscription request with the at least one filtering criterion to a plurality of providers of the information service within the MEC network;

means for decoding a response message received from at least one provider of the plurality of providers, the response message indicating an acceptance of the subscription request by the at least one provider; and means for encoding an acknowledgment message for transmission to the MEC application, the acknowledgment message indicating the acceptance of the subscription request by the at least one provider and activation of a subscription of the MEC application to the information service provided by the at least one provider.

25. The apparatus of claim 24, comprising:

means for detecting a second subscription request to a second information service, the second subscription request originating from the MEC application, the second subscription request including at least a second filtering criterion indicative of an application layer protocol supported by the MEC application;

means for forwarding the second subscription request with the at least second filtering criterion to the plurality of providers, and the plurality of providers instantiated as a corresponding plurality of MEC applications providing the second information service;

means for encoding an acknowledgment message for transmission to the MEC application, the acknowledgment message indicating acceptance of the second subscription request by the apparatus;

means for decoding an information message from at least a second provider of the plurality of providers, the information message associated with the second subscription request and configured based on an application layer protocol supported by the at least second provider, wherein the application layer protocol supported by the at least second provider is incompatible with the application layer protocol supported by the MEC application;

means for performing protocol conversion of the information message to the application layer protocol supported by the MEC application to generate a converted information message; and means for encoding the converted information message for transmission to the MEC application in response to the second subscription request.

* * * * *